United States Patent
Liu

(10) Patent No.: US 12,268,962 B2
(45) Date of Patent: Apr. 8, 2025

(54) METHOD AND APPARATUS FOR USING VIRTUAL ITEM, COMPUTER DEVICE, AND STORAGE MEDIUM

(71) Applicant: TENCENT TECHNOLOGY (SHENZHEN) COMPANY LIMITED, Guangdong (CN)

(72) Inventor: Zhihong Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 476 days.

(21) Appl. No.: 17/672,301

(22) Filed: Feb. 15, 2022

(65) Prior Publication Data

US 2022/0168642 A1 Jun. 2, 2022

Related U.S. Application Data

(63) Continuation of application No. PCT/CN2020/123672, filed on Oct. 26, 2020.

(30) Foreign Application Priority Data

Jan. 16, 2020 (CN) .......................... 202010048869.9

(51) Int. Cl.
  *A63F 13/55* (2014.01)
  *A63F 13/53* (2014.01)
  *A63F 13/837* (2014.01)

(52) U.S. Cl.
  CPC .............. *A63F 13/55* (2014.09); *A63F 13/53* (2014.09); *A63F 13/837* (2014.09); *A63F 2300/8076* (2013.01)

(58) Field of Classification Search
  CPC ........ A63F 13/55; A63F 13/53; A63F 13/837; A63F 2300/8076
  See application file for complete search history.

(56) References Cited

U.S. PATENT DOCUMENTS 9,480,921 B2 * 11/2016 Yudo ...................... A63F 13/577
10,403,096 B1 * 9/2019 Oberberger .......... G07F 17/3211
(Continued)

FOREIGN PATENT DOCUMENTS

CN 105912474 A 8/2016
CN 106201877 A 12/2016
(Continued)

OTHER PUBLICATIONS

International Search Report and Written Opinion for PCT/CN2020/123672, issued Jan. 27, 2021, 13 pages, English translation included.
(Continued)

*Primary Examiner* — William H McCulloch, Jr.
*Assistant Examiner* — Ankit B Doshi
(74) *Attorney, Agent, or Firm* — ArentFox Schiff LLP

(57) ABSTRACT

Some aspects of the disclosure provide a method for virtual environment control. The method includes displaying a first user interface (UI) that provides a virtual environment observed from a perspective of a first virtual character that has a first virtual item, and controlling, in response to a firing instruction, the first virtual character to use the first virtual item. The method also includes determining a category of a subject in an influence range of the first virtual item from a plurality of categories that the first virtual item is capable to influence on. The plurality of categories includes at least a virtual character category and a virtual item category. The method also includes controlling the first virtual item to produce an effect on the subject based on the determined category. The effect can change an attribute value associated with the determined category of the subject.

20 Claims, 18 Drawing Sheets

(56) References Cited

U.S. PATENT DOCUMENTS

| | | | | |
|---|---|---|---|---|
| 11,007,439 | B1* | 5/2021 | Pineda | A63F 13/847 |
| 2007/0218965 | A1* | 9/2007 | Tilston | A63F 13/45 |
| | | | | 463/2 |
| 2013/0165194 | A1* | 6/2013 | Nojiri | A63F 13/10 |
| | | | | 463/5 |
| 2015/0258442 | A1* | 9/2015 | Yudo | A63F 13/537 |
| | | | | 463/31 |
| 2015/0273331 | A1* | 10/2015 | McMain | A63F 13/45 |
| | | | | 463/31 |
| 2019/0070512 | A1* | 3/2019 | Fuller | A63F 13/795 |
| 2019/0083888 | A1 | 3/2019 | Ziaja et al. | |
| 2020/0206639 | A1* | 7/2020 | Nakano | A63F 13/58 |

FOREIGN PATENT DOCUMENTS

| | | |
|---|---|---|
| CN | 107129420 A | 9/2017 |
| CN | 110523080 A | 12/2019 |
| CN | 110538459 A | 12/2019 |
| CN | 110585712 A | 12/2019 |
| CN | 110585731 A | 12/2019 |
| CN | 111265873 A | 6/2020 |

OTHER PUBLICATIONS

Chinese Office Action issued Dec. 23, 2020 in Application No. 202010048869.9 with English Translation.
"Call of Duty Wiki", EMP Grenade, Wayback Machine, Available on the Internet at: https://web.archive.org/web/20190619225404/https://callofduty.fandom.com/wiki/EMP_Grenade, Jun. 19, 2019, 5 pages.
"Call of Duty Wiki", Flashbang, Wayback Machine, Available on the Internet at: https://web.archive.org/web/20191102075649/https://callofduty.fandom.com/wiki/Flashbang, Nov. 2, 2019, 8 pages.
Search Report and Search Opinion received for Singaporean Application No. 11202203195V, mailed on Jan. 1, 2025, 12 pages.

* cited by examiner

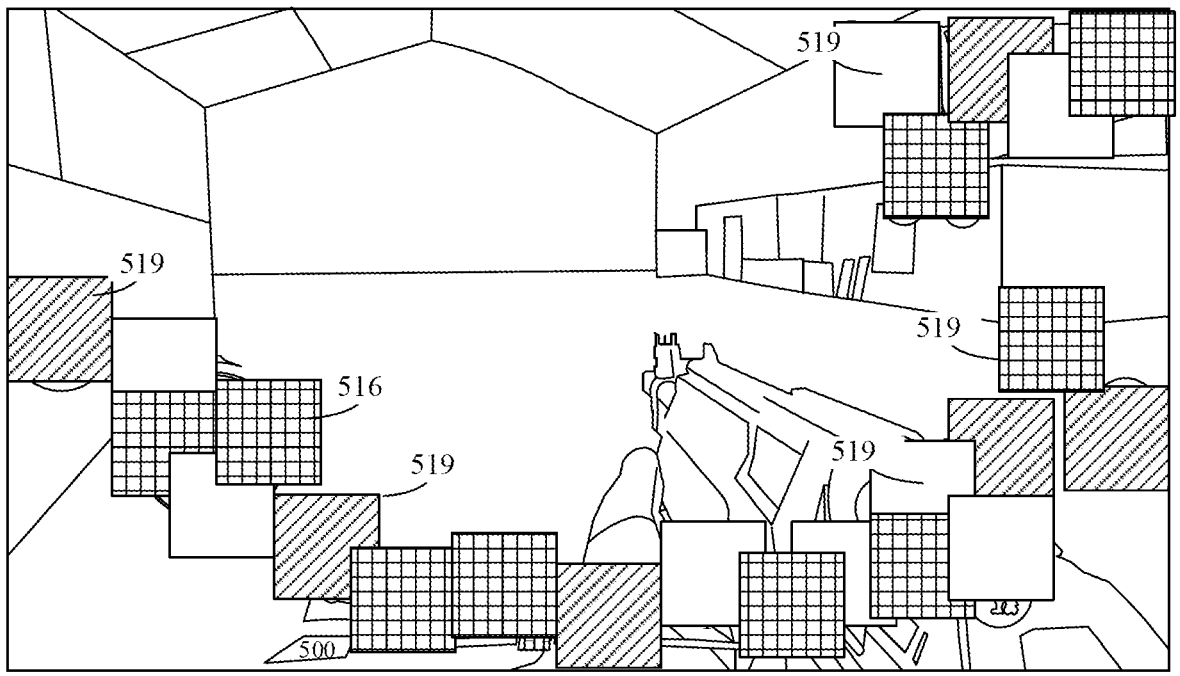

FIG. 17

| | |
|---|---|
| Display a third UI, the third UI including a third picture and a man-machine interaction control at a first position, and the third picture being a picture of a virtual environment observed from a perspective of a second virtual character | 207 |
| Receive a use result of a first virtual item transmitted by a server | 208 |
| Display a fourth UI in response to the use result, the fourth UI including a fourth picture and an occlusion region at the first position, the fourth picture being a picture of the virtual environment observed from the perspective of the second virtual character, and the occlusion region occluding part of or the entire man-machine interaction control | 209 |
| Control, in response to receiving a control instruction based on the man-machine interaction control, the second virtual character to move in the virtual environment, the control instruction being generated according to a trigger operation received on the man-machine interaction control in the occlusion region | 210 |

FIG. 18

METHOD AND APPARATUS FOR USING VIRTUAL ITEM, COMPUTER DEVICE, AND STORAGE MEDIUM

RELATED APPLICATIONS

This application is a continuation of International Application No. PCT/CN2020/123672, entitled "METHOD AND APPARATUS FOR USING VIRTUAL ITEM, COMPUTER DEVICE, AND STORAGE MEDIUM" and filed on Oct. 26, 2020, which claims priority to Chinese Patent Application No. 202010048869.9, filed on Jan. 16, 2020 and entitled "METHOD AND APPARATUS FOR USING VIRTUAL ITEM, DEVICE, AND STORAGE MEDIUM". The entire disclosures of the prior applications are hereby incorporated by reference in their entirety.

FIELD OF THE TECHNOLOGY

This application relates to the field of application programs supporting virtual environments, including a method and apparatus for using a virtual item, a computer device, and a storage medium.

BACKGROUND OF THE DISCLOSURE

In an application program based on a three-dimensional (3D) virtual environment, for example, a first-person shooting (FPS) game, a virtual character may use a heavy weapon that automatically attacks targets to attack a hostile virtual character. For example, the virtual character may use a heavy machine gun, and place the heavy machine gun somewhere in the 3D virtual environment. After being placed, the heavy machine gun can automatically lock and attack all hostile virtual characters within a specific range.

In the related art, the virtual character may destroy the heavy weapon by shooting. For example, the user controls the virtual character to use a light weapon to attack the heavy weapon for a plurality of times by constantly triggering a firing control. After the heavy weapon sustains a specific amount of damage, the server confirms that the heavy weapon is destroyed, stops the automatic attack mode of the heavy weapon, and displays on the terminal that the heavy weapon is destroyed.

In the related art, the user needs to perform a trigger operation on the firing control for a plurality of times to destroy a heavy weapon. In addition, to destroy a heavy weapon in a short time, the user often needs to touch the firing control at a high frequency, so that the destruction operation is excessively cumbersome and complex, resulting in low man-machine interaction efficiency.

SUMMARY

Embodiments of this disclosure provide a method and apparatus for using a virtual item, a computer device, and a non-transitory computer-readable storage medium, to improve the man-machine interaction efficiency.

Some aspects of the disclosure provide a method for virtual environment control. The method includes displaying a first user interface (UI) that provides a virtual environment observed from a perspective of a first virtual character that has a first virtual item, and controlling, in response to a firing instruction, the first virtual character to use the first virtual item. The method also includes determining a category of a subject in an influence range of the first virtual item from a plurality of categories that the first virtual item is capable to influence on. The plurality of categories includes at least a virtual character category and a virtual item category. The method also includes controlling the first virtual item to produce an effect on the subject based on the determined category. The effect can change an attribute value associated with the determined category of the subject.

In some examples, the method includes controlling, in response to the subject being a second virtual character in the virtual character category, the first virtual item to produce a first effect on the second virtual character. The first effect affects a first attribute value of the second virtual character. In some examples, the method includes controlling, in response to the subject being a second virtual item in the virtual item category, the first virtual item to produce a second effect on the second virtual item. The second effect changes a second attribute value of the second virtual item.

Some aspects of the disclosure provide a method for virtual environment control. The method includes displaying a third user interface (UI) that provides a virtual environment observed from a perspective of a second virtual character, and a control interface for a man-machine interaction. The method further includes receiving a use result of a first virtual item transmitted by a server, and displaying a fourth UI in response to the use result, the fourth UI provides the virtual environment observed from the perspective of the second virtual character, and the control interface that is at least partially occluded.

Some aspects of the disclosure provide an apparatus that includes processing circuitry for virtual environment control. The processing circuitry can display a first user interface (UI) that provides a virtual environment observed from a perspective of a first virtual character that has a first virtual item, and control, in response to a firing instruction, the first virtual character to use the first virtual item. The processing circuitry can also determine a category of a subject in an influence range of the first virtual item from a plurality of categories that the first virtual item is capable to influence on. The plurality of categories includes at least a virtual character category and a virtual item category. The processing circuitry can also control the first virtual item to produce an effect on the subject based on the determined category, the effect changing an attribute value associated with the determined category of the subject.

In some examples, the processing circuitry can control, in response to the subject being a second virtual character in the virtual character category, the first virtual item to produce a first effect on the second virtual character. The first effect affects a first attribute value of the second virtual character. In some examples, the processing circuitry can control, in response to the subject being a second virtual item in the virtual item category, the first virtual item to produce a second effect on the second virtual item. The second effect changes a second attribute value of the second virtual item.

Some aspects of the disclosure provide an apparatus that includes processing circuitry for virtual environment control. The processing circuitry is configured to generate a third user interface (UI) that provides a virtual environment observed from a perspective of a second virtual character, and includes a control interface for a man-machine interaction. The processing circuitry is further configured to receive a use result of a first virtual item transmitted by a server, and generate a fourth UI in response to the use result. The fourth UI provides the virtual environment observed from the perspective of the second virtual character, and the control interface that is at least partially occluded.

According to another aspect of this disclosure, a computer device is provided, including a processor and a memory, the memory storing at least one instruction, at least one program, a code set, or an instruction set, the at least one instruction, the at least one program, the code set, or the instruction set being loaded and executed by the processor to implement the method for using a virtual item described in the foregoing aspects.

According to another aspect of this disclosure, a non-transitory computer-readable storage medium is provided, storing at least one computer program, the at least one computer program being loaded and executed by a processor to implement the method for using a virtual item described in the foregoing aspects.

According to another aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the method for using a virtual item in the foregoing implementations.

The technical solutions provided in the embodiments of this disclosure can include at least the following beneficial effects:

A non-harmful virtual item is provided, and when a virtual character uses the virtual item on a heavy weapon, a change of a specified attribute value of the heavy weapon is controlled, so that the user does not need to change the specified attribute value of the heavy weapon by attacking the heavy weapon for a plurality of times, thereby preventing the user from spending too much time, simplifying the process for the user to change the specified attribute value of the heavy weapon, simplifying the user operation, and improving the man-machine interaction efficiency. In addition, quickly changing the specified attribute value of the heavy weapon can reduce the server load, speed up the game, and end the game in a shorter time, so that the server can provide more players with the game within a unit time period. The server resources are saved, and the server performance is improved. The server resources during peak periods are saved in particular.

BRIEF DESCRIPTION OF THE DRAWINGS

To describe technical solutions in embodiments of this disclosure more clearly, the following briefly introduces the accompanying drawings required for describing the embodiments. The accompanying drawings in the following description show some embodiments of this disclosure.

FIG. 17 is a schematic diagram of a UI of a method for using a virtual item according to another exemplary embodiment of this disclosure.

FIG. 18 is a flowchart of a method for using a virtual item according to another exemplary embodiment of this disclosure.

DESCRIPTION OF EMBODIMENTS

Figure 1:
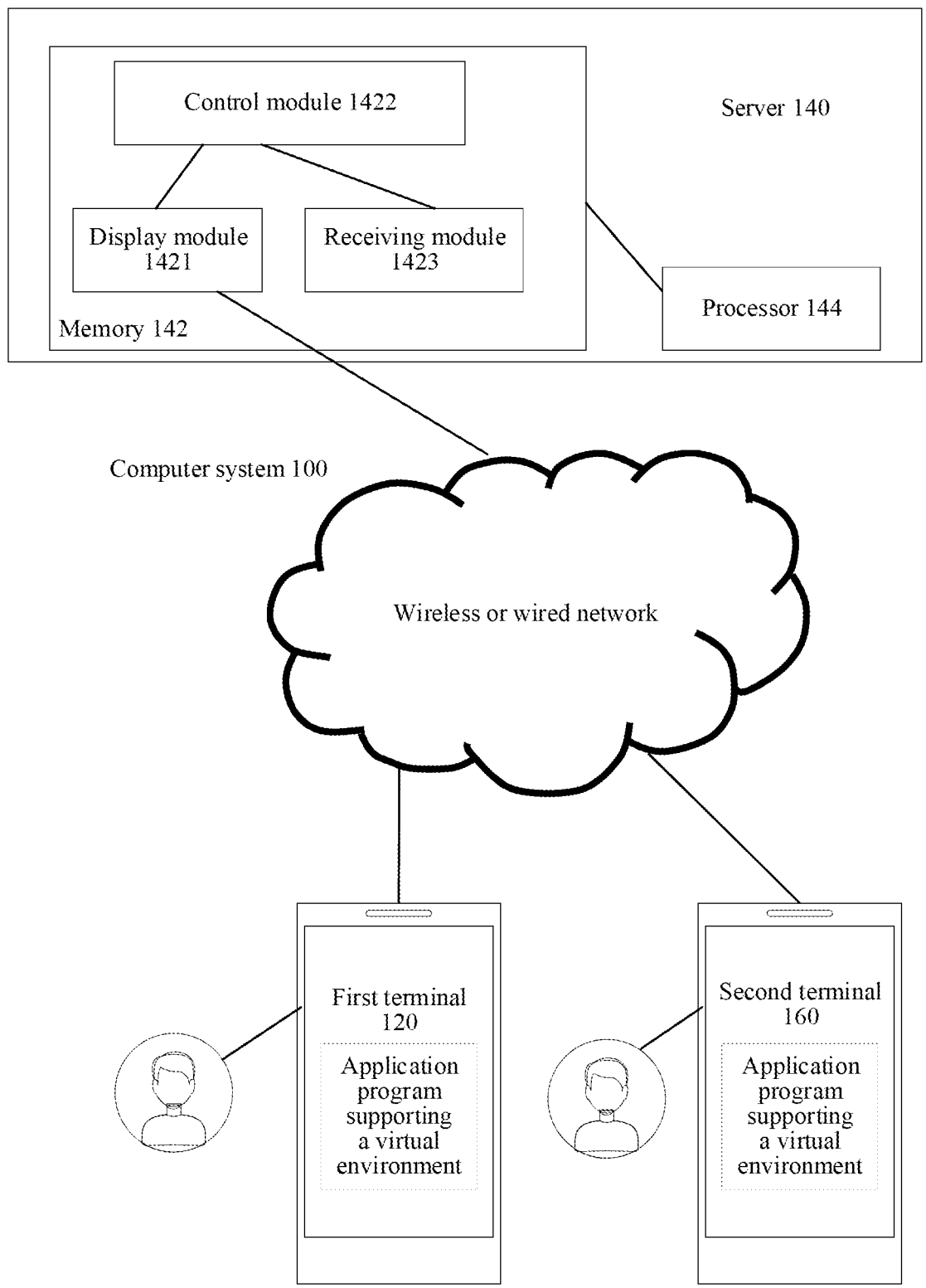
FIG. 1 is a block diagram of an implementation environment according to an exemplary embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

"Several" mentioned in this specification means one or more, and "plurality of" means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

To make objectives, technical solutions, and advantages of this disclosure clearer, the following further describes implementations of this disclosure in detail with reference to the accompanying drawings.

First, terms involved in the embodiments of this disclosure are introduced:

Virtual environment: It is a virtual environment displayed (or provided) by an application program when run on a terminal (also referred to as a terminal device). The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, or a 3D virtual environment. This is not limited in the embodiments of this disclosure. A description is made by using an example in which the virtual environment is a 3D virtual environment in the following embodiments.

Virtual character: It is a movable object in a virtual environment. The movable object may be a virtual person, a virtual animal, a cartoon character, or the like, such as a character, an animal, a plant, an oil drum, a wall, or a stone displayed in a 3D virtual environment. In some examples, the virtual character is a 3D model created based on a skeletal animation technology. Each virtual character has a respective shape and size in the 3D virtual environment, and occupies some space in the 3D virtual environment.

Virtual item: Virtual items include at least one of a virtual weapon, a functional item, or a virtual device. For example, in this disclosure, virtual items refer to virtual weapons, and the virtual weapons are weapons that can be used by virtual characters in a virtual environment. For example, a virtual weapon is an item that affects an activity state or a hit point value of another virtual character after being used by a virtual character. The virtual weapons include cold weapons, firearms, artillery, armored combat vehicles, anti-riot weapons, biological and chemical weapons, nuclear weapons, new concept weapons, and the like. For example, the virtual items may be knives, guns, swords, pistols, rifles, submachine guns, machine guns, special guns, shotguns, grenades, rocket launchers, mortars, tank guns, cannons, missiles, laser weapons, microwave weapons, particle beams weapons, kinetic energy interceptors, electromagnetic guns, pulse weapons, signal jamming weapons, and the like. For example, a second virtual item in this disclosure refers to a heavy weapon, such as a heavy machine gun, a missile, artillery, or an armored combat vehicle. For example, a first virtual item in this disclosure refers to a shooting or throwing virtual weapon, such as a grenade, an electromagnetic pulse, a flash grenade, a smoke grenade, or a missile.

An FPS game is a shooting game in which a user can play from a first-person perspective. A virtual environment picture in the game is a picture of a virtual environment observed from a perspective of a first virtual character. In the game, at least two virtual characters play in a single-round battle mode in the virtual environment. The virtual character escapes attacks by other virtual characters and/or dangers (such as a poison gas area, a swamp, and a bomb) in the virtual environment to survive in the virtual environment. When the hit point value of the virtual character in the virtual environment is zero, the life of the virtual character in the virtual environment ends, and the final virtual character surviving in the virtual environment wins. In some examples, a battle starts with a moment when a first client joins the battle, and ends with a moment when the last client exits the battle. Each client may control one or more virtual characters in the virtual environment. In some examples, arena modes of the battle may include a single-player battle mode, a two-player team battle mode, or a multi-player team battle mode. The battle mode is not limited in the embodiments of this disclosure.

UI control: It is any visual control or element that can be seen in a UI of an application program, for example, a control such as a picture, an input box, a text box, a button, or a label. Some UI controls respond to an operation of the user. For example, the user triggers a use control to control the first virtual character to use the first virtual item.

In the embodiments of this disclosure, when a virtual weapon is "equipped, carried, or assembled", it means that a virtual character owns the virtual weapon, or the virtual character owns an inventory with an inventory slot and the virtual weapon is stored in the inventory of the virtual character, or the virtual character is using the virtual weapon.

The method provided in this disclosure may be applied to a virtual reality (VR) application program, a 3D map program, a military simulation program, an FPS game, a multiplayer online battle arena (MOBA) game, and the like. An disclosure in a game is used as an example for description in the following embodiments.

A game based on a virtual environment usually includes maps of one or more game worlds. The virtual environment in the game simulates scenes in the real world. A user may control a virtual character in the game to perform actions in the virtual environment such as walking, running, jumping, shooting, fighting, driving, using a virtual weapon to attack another virtual character, and using a virtual weapon to charge up attacks on another virtual character, which has relatively high interactivity. In addition, a plurality of users may form a team online to perform an arena game.

FIG. 1 is a structural block diagram of a computer system according to an exemplary embodiment of this disclosure. The computer system 100 includes a first terminal 120, a server 140, and a second terminal 160.

An application program supporting a virtual environment is installed and run on the first terminal 120. The application program may be any one of a VR application program, a 3D map application, a military simulation program, an FPS game, a MOBA game, or a multiplayer gunfight survival game. The first terminal 120 is a terminal used by a first user. The first user uses the first terminal 120 to control a first virtual character in a virtual environment to perform motions. The motions include, but are not limited to, at least one of body posture adjustment, crawling, walking, running, cycling, jumping, driving, shooting, throwing, using a virtual weapon to attack another virtual character, or using a virtual weapon to charge up attacks on another virtual character. For example, the first virtual character is a first virtual person, such as a simulated character object or a cartoon character object.

The first terminal 120 is connected to the server 140 by using a wireless network or a wired network.

The server 140 includes at least one of one server, a plurality of servers, a cloud computing platform, or a virtualization center. For example, the server 140 includes a processor 144 and a memory 142. The memory 142 includes a display module 1421, a control module 1422, and a receiving module 1423. The server 140 is configured to provide a backend service for an application program supporting a 3D virtual environment. In some examples, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

An application program supporting a virtual environment is installed and run on the second terminal 160. The application program may be any one of a VR application program, a 3D map application, a military simulation program, an FPS game, a MOBA game, or a multiplayer gunfight survival game. The second terminal 160 is a terminal used by a second user. The second user uses the second terminal 160 to control a second virtual character in a virtual environment to perform motions. The motions include, but are not limited to, at least one of body posture adjustment, crawling, walking, running, cycling, jumping, driving, shooting, throwing, using a virtual weapon to attack another virtual character, or using a virtual weapon to charge up attacks on another virtual character. For example, the second virtual character is a second virtual person, such as a simulated character object or a cartoon character object.

In some examples, the first virtual person and the second virtual person are located in the same virtual environment.

In some examples, the application programs installed on the first terminal 120 and the second terminal 160 are the same, or the application programs installed on the two terminals are the same type of application programs in different control system platforms. The first terminal 120 may be generally one of a plurality of terminals, and the second terminal 160 may be generally one of a plurality of terminals. In this embodiment, only the first terminal 120 and the second terminal 160 are used as examples for description. Device types of the first terminal 120 and the second terminal 160 are the same or different. The device types include at least one of an augmented reality (AR) device, a VR device, a smart wearable device, a smartphone, a tablet computer, an ebook reader, a Moving Picture Experts Group Audio Layer III (MP3) player, a Moving Picture Experts Group Audio Layer IV (MP4) player, a laptop, or a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminal are not limited in the embodiments of this disclosure.

This disclosure provides a virtual item (a first virtual item), and the first virtual item may be used to quickly destroy another virtual item (a second virtual item) within a specific range. For example, the another virtual item is a virtual item that can automatically perform an attack without user operation. For example, the function of the first virtual item is at least one of destroying another virtual item or interfere with another virtual character (a second virtual character). The effect of the first virtual item interfering with another virtual character is to affect the display of a UI control on the client. That is, the UI control on the UI is occluded by mosaics or in another manner, so that the user cannot see the UI control clearly and thus cannot perform accurate operations. However, the occlusion is only a visual effect, and the user can still trigger the UI control in an original position to control the activity of the virtual character. For example, the effect of the first virtual item interfering with another virtual character may further be reducing a movement speed of another virtual character and limiting part of user operations, for example, a scope cannot be opened for shooting, or the virtual item cannot be used for attacking. For example, the effect of the first virtual item on the virtual character is time-limited, and after a period of time, the effect of the first virtual item on the virtual character automatically disappears.

In a possible implementation, after the first virtual character hits the second virtual item by using the first virtual item, the second virtual item is destroyed and no automatic attack is performed.

In a possible implementation, in response to the second virtual item being destroyed, prompt information indicating that the second virtual item is destroyed is displayed on a first UI corresponding to the first virtual character.

In a possible implementation, after the first virtual character uses the first virtual item to hit the second virtual character, all or part of UI controls on a UI corresponding to the second virtual character are occluded by mosaics or in another manner, so that the user cannot see the UI controls clearly, and the movement speed of the second virtual character is reduced.

In a possible implementation, the UI control is occluded without affecting the normal use of the UI control by the user. For example, the user cannot use a UI control for opening the scope, that is, the user cannot use the scope for shooting.

In a possible implementation, after the first virtual character is equipped with the first virtual item, a computer device receives an operation based on clicking a firing control to throw the first virtual item. A first client calculates a parabola of the first virtual item after being thrown according to information such as a perspective, a position, and an orientation of the first virtual character in real time, and throws, after the user clicks the firing control, the first virtual item to a landing point according to the parabola. For example, the first client selects several points on the parabola, uses the several points to form a special effect line, and displays the special effect line along which the first virtual item is thrown on the first client. The first client transmits the landing point to a server. The server calculates all virtual items that can be acted on by the first virtual item in the virtual environment according to the landing point, and a distance between the virtual character and the landing point, and uses a virtual item and/or virtual character that meets an attack condition as a target. The attack condition may be that a distance from the landing point of the first virtual item is less than an effective radius. The server generates a result of this attack and transmits the result to another client to display the corresponding attack result.

Figure 2:
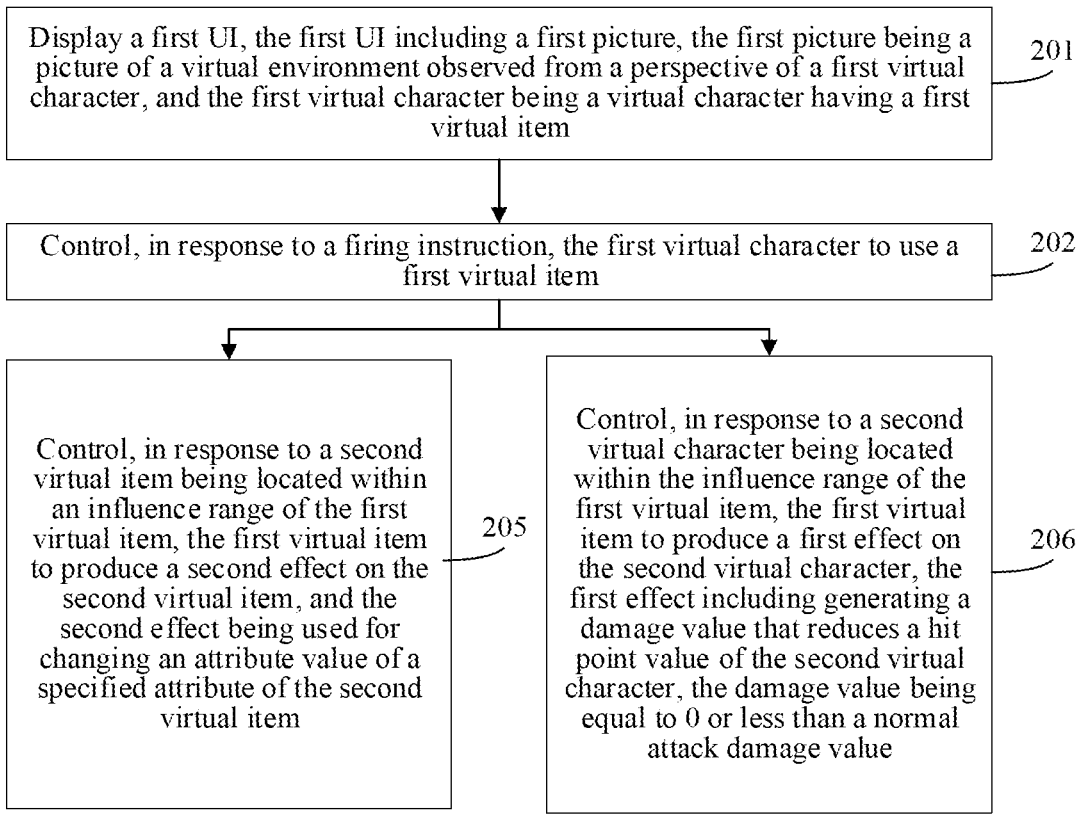
FIG. 2 is a flowchart of a method for using a virtual item according to an exemplary embodiment of this disclosure.

FIG. 2 is a flowchart of a method for using a virtual item according to an exemplary embodiment of this disclosure. The method is applicable to the first terminal 120 or the second terminal 160 in the computer system shown in FIG. 1 or another terminal in the computer system. A first client of an application program that supports a virtual environment is installed on the terminal. The method includes the following steps:

In step 201, a first UI is displayed, the first UI can include a first picture, the first picture is a picture of a virtual environment observed from a perspective of a first virtual character, and the first virtual character is a virtual character having a first virtual item.

The first client displays the first UI.

In some examples, the first picture is a picture of the virtual environment observed from the perspective of the first virtual character. A perspective refers to an observation angle at which observation is performed in a virtual environment from a first-person perspective or a third-person perspective of a virtual character. In some examples, in the embodiments of this disclosure, the perspective is an angle at which the virtual environment is observed by using a camera model in the virtual environment.

In some examples, the camera model performs automatic following on the virtual character in the virtual environment, that is, in a case that the position of the virtual character changes in the virtual environment, the camera model changes at the same time with the position of the virtual character in the virtual environment, and the camera model is always located in a preset distance range of the virtual character in the virtual environment. In some examples, in the automatic following process, a relative position between the camera model and the virtual character remains unchanged.

The camera model is a 3D model located around the virtual character in the 3D virtual environment. When a first-person perspective is used, the camera model is located around the head of the virtual character or located at the head of the virtual character. When a third-person perspective is used, the camera model may be located behind the virtual character and bound to the virtual character, or may be located at any position away from the virtual character by a preset distance. The virtual character located in the virtual environment may be observed from different angles through the camera model. In some examples, when the third-person perspective is an over-shoulder perspective of the virtual character, the camera model is located behind the virtual character (for example, the head and shoulder of the virtual character). In some examples, in addition to the first-person perspective and the third-person perspective, there are other perspectives, for example, a top perspective. The top perspective is a perspective of the virtual environment observed at an angle from the air. When the top perspective is used, the camera model may be located above the head of the virtual character. In some examples, the camera model is not actually displayed in the virtual environment. In other words, the camera model is not displayed in the virtual environment displayed in the UI.

In this embodiment of this disclosure, a description is made by using an example in which the camera model is located at any position at a preset distance from the virtual character. In some examples, one virtual character corresponds to one camera model, and the camera model may rotate with the virtual character as a rotation center. For example, the camera model is rotated with any point of the virtual character as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual character may be the head or the torso of the virtual character, or any point around the virtual character. This is not limited in the embodiments of this disclosure. In some examples, in a case that the camera model observes the virtual character, a center orientation of the perspective of the camera model points to a direction of a point of the sphere surface where the camera model is located pointing to the sphere center.

In some examples, the camera model may further observe the virtual character from different directions of the virtual character at a preset angle.

Figure 3:
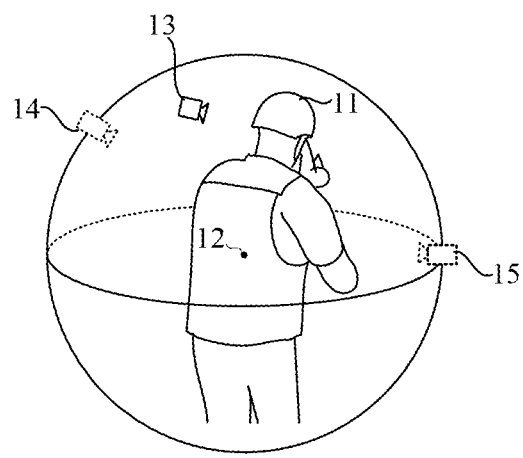
FIG. 3 is a schematic diagram of a camera model corresponding to a perspective of a virtual character according to an exemplary embodiment of this disclosure.

For example, referring to FIG. 3, a point in a virtual character 11 is determined as a rotation center 12, and the camera model rotates around the rotation center 12. In some examples, the camera model is configured with an initial position, and the initial position is an upper rear position of the virtual character (for example, a rear position of the brain). For example, as shown in FIG. 3, the initial position is a position 13. When the camera model rotates to a position 14 or a position 15, the perspective direction of the camera model changes as the rotation of the camera model.

In some examples, the virtual environment displayed on the virtual environment picture includes at least one of the following elements: a mountain, a plain, a river, a lake, a sea, a desert, a swamp, quicksand, sky, a plant, a building, a vehicle, or a person.

In some examples, the first virtual character is a virtual character who has the first virtual item. The first virtual item may be a firearm, such as a sniper rifle, a rifle, a pistol, a bow, or an arrow. The first virtual item may alternatively be an equipment item, such as armor, a balloon, a backpack, or a watch. The first virtual item may alternatively be a throwing item, such as a grenade, a flash grenade, a flare, a pulse bomb, or a pan. In some examples, the first virtual character is a virtual character installed on the first terminal and controlled by the first client. In some examples, the first virtual character is controlled by a first user who uses the first terminal.

For example, that the first virtual character has the first virtual item means that the first virtual character has obtained the first virtual item, and can use the first virtual item after at least one operation. For example, the first virtual character holds the first virtual item in the hand, or the first virtual character is equipped with the first virtual item on the body, or the first virtual item is in the backpack of the first virtual character, or the first virtual item is in an equipment bar of the first virtual character, or the first virtual item is in an equipment option bar of the first virtual character.

Figure 4:
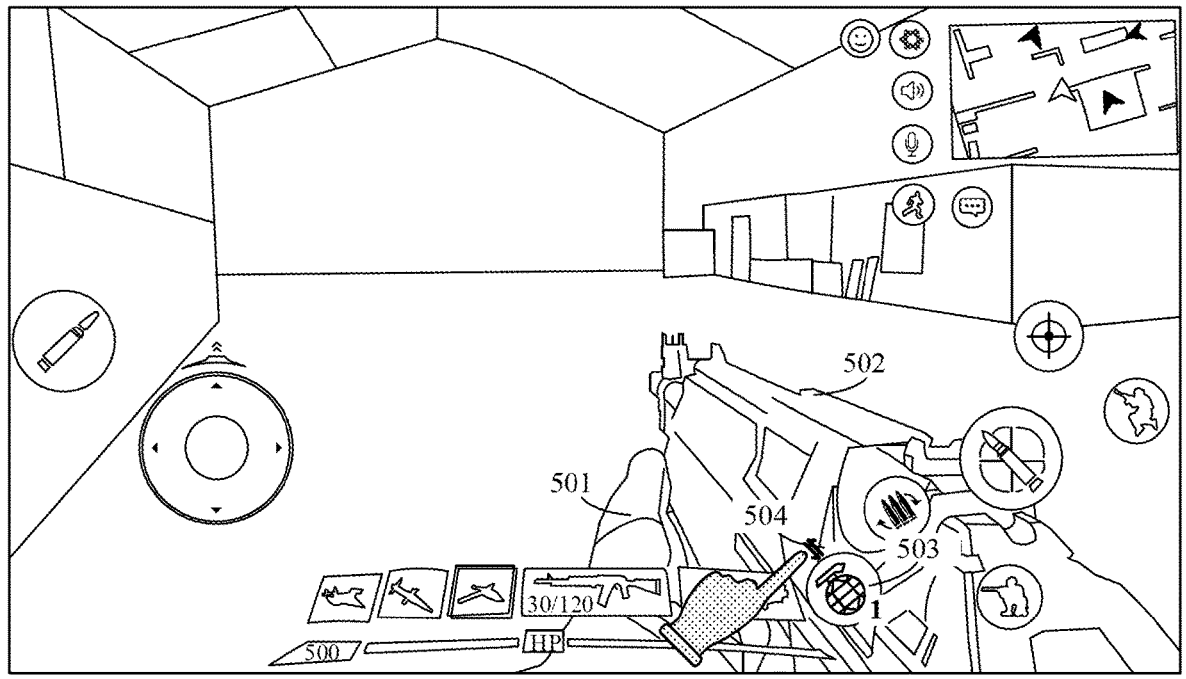
FIG. 4 is a schematic diagram of a UI of a method for using a virtual item according to an exemplary embodiment of this disclosure.
Figure 5:
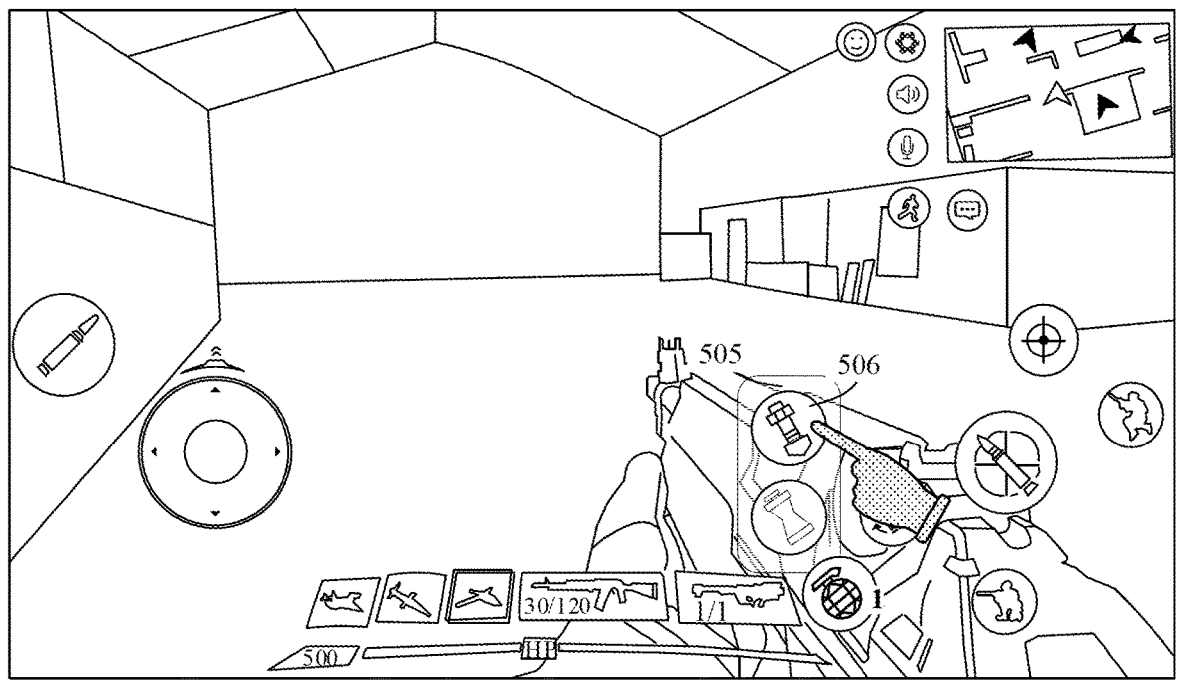
FIG. 5 is a schematic diagram of a UI of a method for using a virtual item according to an exemplary embodiment of this disclosure.

For example, the first virtual item is a handheld throwing item (an electromagnetic pulse bomb). FIG. 4 is a schematic diagram of a UI of a method for using a virtual item according to an exemplary embodiment of this disclosure. As shown in FIG. 4, the interface is a first UI. The first UI includes a first picture obtained by observing the virtual environment from the first-person perspective of the first virtual character. Only part of the model of the first virtual character, that is, a hand 501, is displayed in the first picture. The first virtual character has the first virtual item, that is, the electromagnetic pulse bomb, but the first virtual character in the current state is holding a machine gun 502. A throwing item equipment bar 503 is equipped with a throwing item, that is, a smoke grenade. In this case, the first user may display the first virtual item (the electromagnetic pulse bomb) in the throwing item equipment bar 503 through an equipment item switching operation. The switching operation may be to trigger an equipment switching control 504 on the first UI, to control the first UI to switch to the UI shown in FIG. 5. FIG. 5 is a schematic diagram of a UI of a method for using a virtual item according to an exemplary embodiment of this disclosure. As shown in FIG. 5, in response to receiving a touch operation based on the equipment switching control 504 shown in FIG. 4, a throwing item equipment option bar 505 shown in FIG. 5 pops up in the UI. In response to receiving a user operation based on the selection of a first virtual item (the electromagnetic pulse bomb) 506 in the throwing item equipment option bar 505, the first virtual item (the electromagnetic pulse bomb) 506 is displayed in the throwing item equipment bar 503.

Figure 6:
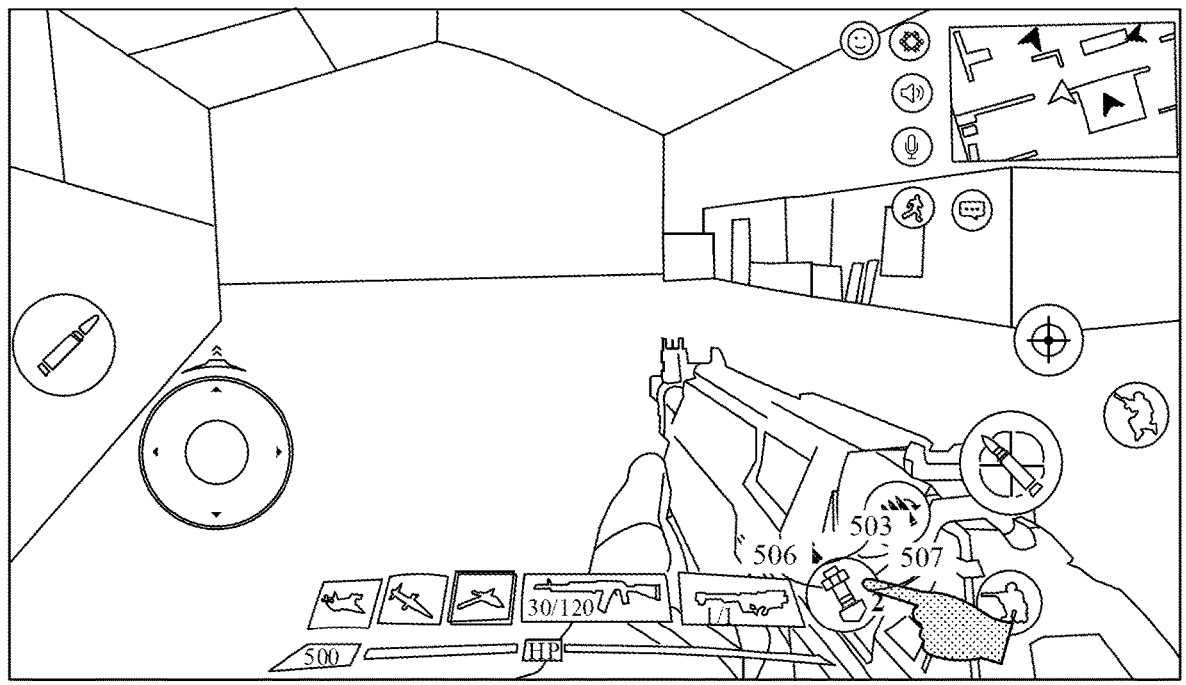
FIG. 6 is a schematic diagram of a UI of a method for using a virtual item according to another exemplary embodiment of this disclosure.
Figure 7:
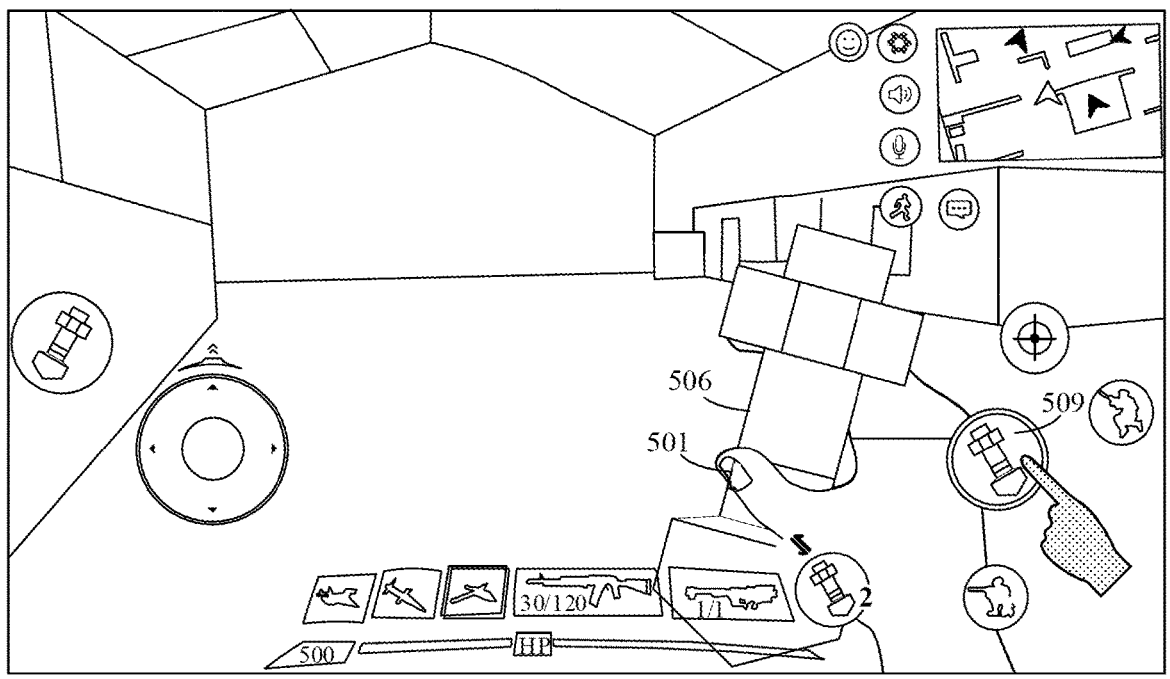
FIG. 7 is a schematic diagram of a UI of a method for using a virtual item according to another exemplary embodiment of this disclosure.

FIG. 6 is a schematic diagram of a UI of a method for using a virtual item according to another exemplary embodiment of this disclosure. As shown in FIG. 6, the first virtual item (the electromagnetic pulse bomb) 506 is displayed in the throwing item equipment bar 503. For example, the first user may further control the first virtual character to equip the current throwing item by triggering an equipment control on the throwing item equipment bar 503. For example, as shown in FIG. 6, the current throwing item in the throwing item equipment bar 503 is the first virtual item (the electromagnetic pulse bomb) 506, and the first user triggers an equipment control 507 to control the first virtual character to equip the first virtual item. FIG. 7 is a schematic diagram of a UI of a method for using a virtual item according to another exemplary embodiment of this disclosure. As shown in FIG. 7, after the first virtual character is equipped with the first virtual item, the hand 501 holds the first virtual item (the electromagnetic pulse bomb) 506. For example, this embodiment shows a method of performing a switching operation through a UI control on a UI. For example, the switching operation may alternatively be implemented in another operation manner, for example, through an operation handle of a game device, through gesture or action recognition of an AR device or a VR device, or through an operation on an input device such as a keyboard or a mouse. For example, the UIs shown in FIG. 4, FIG. 5, FIG. 6, and FIG. 7 may all be the first UI.

Figure 8:
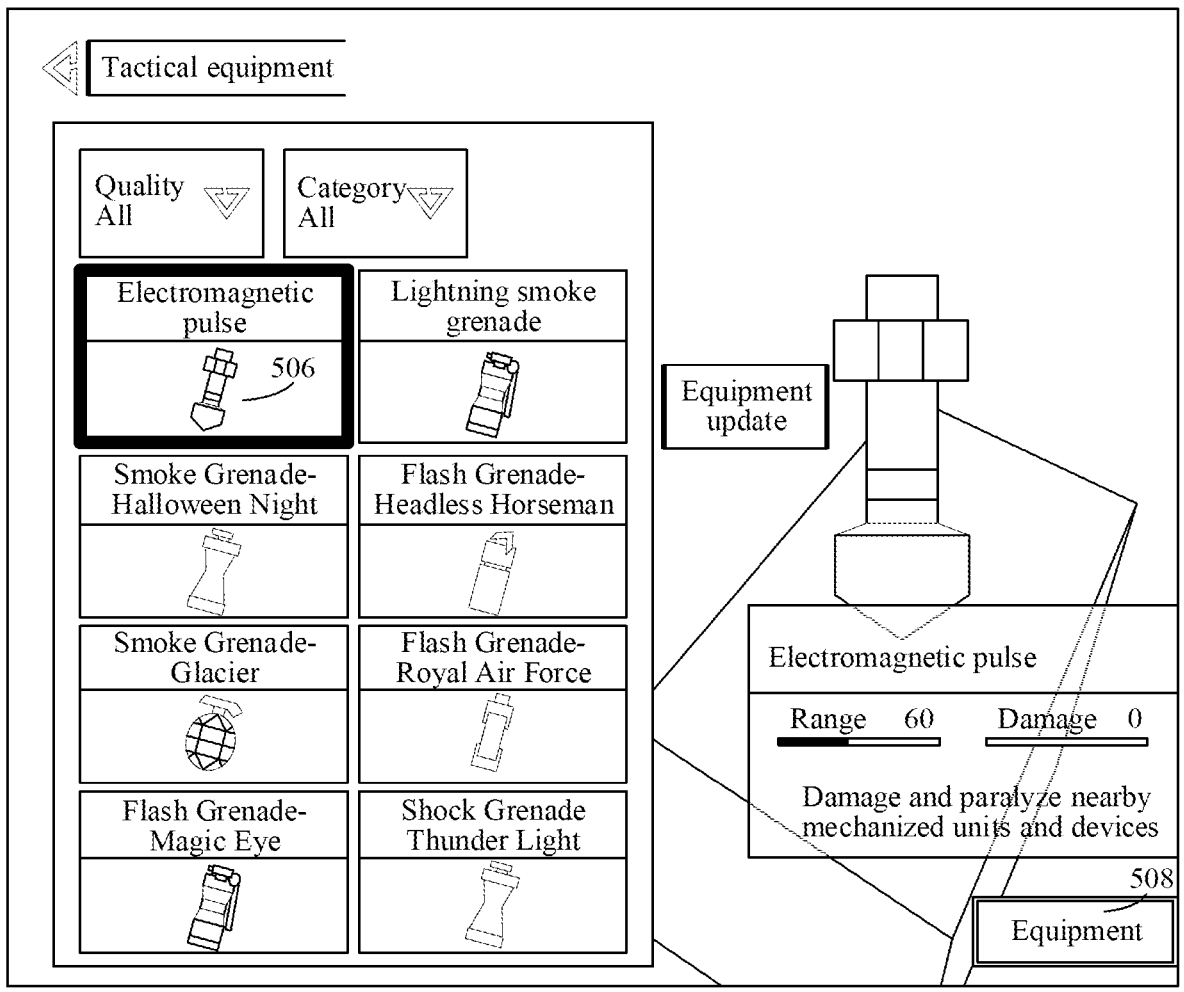
FIG. 8 is a schematic diagram of a UI of a method for using a virtual item according to another exemplary embodiment of this disclosure.

For example, the first virtual item may be picked up by the first virtual character from the virtual environment after entering the game; or may be pre-equipped by the first virtual character before entering the game. For example, in a shooting game, a virtual character may carry some equipment into the game before entering the game. FIG. 8 is a schematic diagram of a UI of a method for using a virtual item according to another exemplary embodiment of this disclosure. As shown in FIG. 8, in a tactical equipment interface, the first user may select the first virtual item (the electromagnetic pulse) 506, and then click the equipment control 508 to equip the first virtual item (the electromagnetic pulse) 506. After entering the game, the first virtual item (the electromagnetic pulse) is directly placed in the backpack or equipment bar of the first virtual character, which does not need to be picked up from the virtual environment or obtained during the game.

In step 202, in response to a firing instruction, the first virtual character is controlled to use a first virtual item.

The first client controls, in response to a firing instruction, the first virtual character to use a first virtual item.

The firing instruction is generated after the first client obtains a firing operation of the first user; or, the firing instruction is generated by the first client; or, the firing instruction is transmitted by the server to the first client. The firing instruction instructs the first user to use the first virtual item. For example, the firing instruction includes use manners of the first virtual item, such as a use time, a use location, a use quantity, a use target, a use direction, a use force, and a use distance of the first virtual item. The first client controls the first virtual character to use the first virtual item according to the firing instruction.

For example, the firing instruction is generated after the first client obtains the firing operation of the first user. The firing operation may be the first user triggering the UI control on the UI, a gesture or action operation of the first user, a voice instruction of the first user, or a control operation of the first user using an input device such as a keyboard, a gamepad, or a mouse. For example, the first user may trigger various operations of the UI control or the input device, for example, clicking, double clicking, long pressing, sliding, pressing, and tapping. For example, the first client may generate the firing instruction by recognizing the gesture or action operation. For example, the first client generates the firing instruction by recognizing a throwing action made by the first user. For example, the first client may alternatively generate the firing instruction by recognizing the voice instruction issued by the first user. For example, the first client may generate the firing instruction after recognizing "throw in the direction of 1 o'clock" spoken by the first user. For example, the first client may alternatively generate the firing instruction by recognizing the touch operation of the first user on the firing control. For example, as shown in FIG. 7, there is a firing control 509 on the first UI. After the first user triggers the firing control 509, the first client generates the firing instruction to control the first virtual character to use the first virtual item (the electromagnetic pulse) 506.

In step 205, in response to a second virtual item being located within an influence range of the first virtual item, the first virtual item is controlled to produce a second effect on the second virtual item, and the second effect is used for changing an attribute value of a specified attribute of the second virtual item.

The first client controls, in response to a second virtual item being located within an influence range of the first virtual item, the first virtual item to produce a second effect on the second virtual item.

In a possible implementation, the first virtual item produces different effects on the virtual character and the virtual item.

In a possible implementation, the second effect includes any one of destroying the second virtual item, reducing an attribute value of a first specified attribute of the second virtual item, or increasing an attribute value of a second specified attribute of the second virtual item; and the destroying the second virtual item refers to deducting an attribute value of a third specified attribute of the second virtual item, the third specified attribute being used for implementing an original function of the second virtual item.

In a possible implementation, when the effect is to destroy the second virtual item, destroying refers to disabling all or some of original functions of the virtual item, or disabling the virtual item. For example, if the first virtual item destroys the second virtual item that can automatically target an enemy and fire, the second virtual item cannot automatically target the enemy and fire, or the second virtual item can automatically target but cannot fire.

In a possible implementation, when the second effect is to reduce the attribute value (performance) of the first specified attribute of the second virtual item, taking the second virtual item being a machine gun as an example, an original speed of a bullet shot by the second virtual item is 5 m/s, and a firing frequency is 1 round/s. When the second virtual item is within the influence range of the first virtual item, under the action of the first virtual item, the speed of the bullet shot by the second virtual item is reduced to 1 m/s, and the firing frequency is reduced to 1 round/minute, which reduces the attack power of the second virtual item.

In a possible implementation, when the second effect is to increase the attribute value of the second specified attribute of the second virtual item, that is, produce a gain effect on the second virtual item, the second effect may be to increase the attack power of the second virtual item, increase a firing range of the second virtual item, increase the defense power of the second virtual item, or the like.

In a possible implementation, the second virtual items include a first type of virtual items and a second type of virtual items. The first type of virtual items refers to virtual items with the automatic attack function. The second type of virtual items refers to virtual items without the automatic attack function.

In a possible implementation, the first virtual item produces the second effect on one of the first type of virtual items and the second type of virtual items. For example, the first virtual item only produces the second effect on the virtual items with the automatic attack function (the first type of virtual items), and does not produce the second effect on the virtual items without the automatic attack function (the second type of virtual items). Alternatively, the first virtual item produces different effects on different types of second virtual items. For example, the first virtual item destroys the virtual items with the automatic attack function (the first type of virtual items), and reduces the durability of the virtual items without the automatic attack function (the second type of virtual items), where the durability is used for indicating a limit of the virtual items that can withstand a maximum function.

The influence range is a range within which the first virtual item is capable of producing an effect. The influence range may be a bounded space range, or may be a directional range for a specific target or specific targets. The method of determining the influence range may be arbitrary. For example, the influence range may be a range of a sphere with a radius R and with the first virtual character being a center; or may be a region range (a two-dimensional region) selected when the first virtual character uses the first virtual item. The space above or/and below the region belongs to the influence range, or a specific height of space above or/and below the region belongs to the influence range. Alternatively, one or some targets selected by the first virtual character when using the first virtual item as the influence range; or a virtual item or virtual character hit by the first virtual item is used as the influence range; or after the first virtual item hits a specific point, a 3D space determined by using the point as a reference point is used as the influence range.

The second virtual item is a virtual item with capabilities for attack. Having the capabilities for attack means that the second virtual item acts on the first virtual item or other virtual items to reduce a specified attribute value (for example, a hit point value).

In a possible implementation, the second virtual item may be a virtual item equipped by another virtual character, or may be a virtual item placed at a specific position. The virtual item placed at a specific position may be a virtual item that is controlled by the virtual character for attack, or may be a virtual item that automatically performs an attack. For example, the second virtual item may be a machine gun equipped on an armored vehicle for automatic attack, or the second virtual item may be a virtual item placed on the ground and controlled by another virtual character for attack.

In a possible implementation, the second virtual item is a virtual item with capabilities for automatic attack. The automatic attack means that the virtual item does not need to be controlled by another virtual character (another client), and can automatically recognize a virtual character entering an attack range and automatically target the virtual character for attack.

Figure 9:
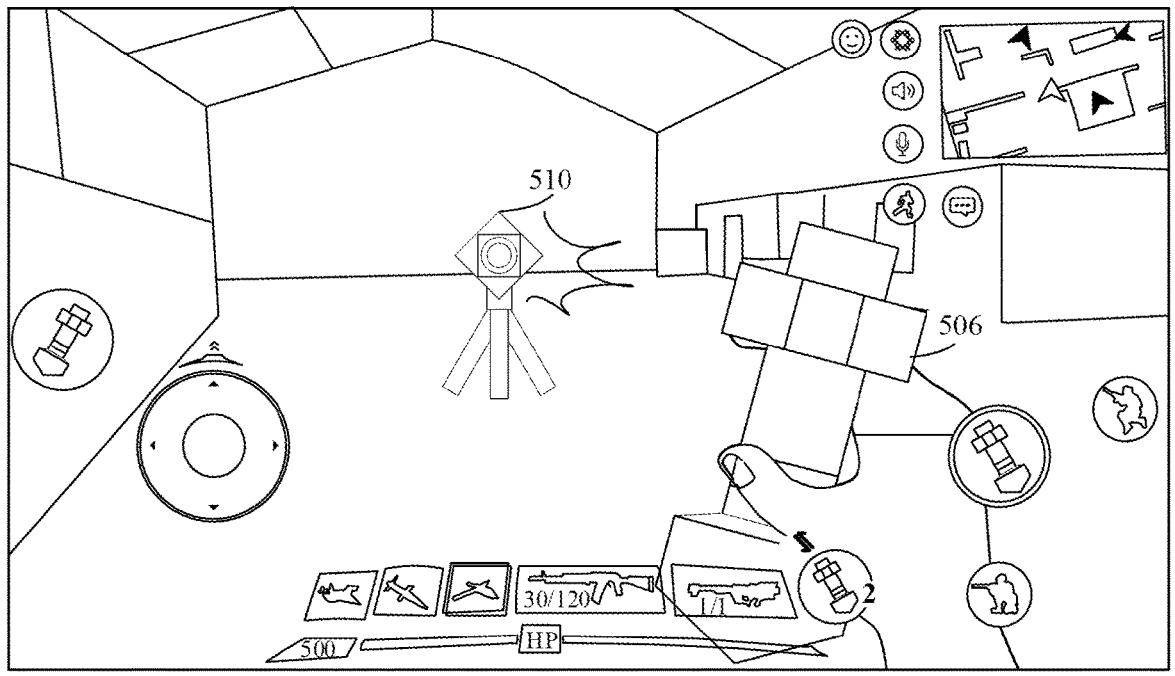
FIG. 9 is a schematic diagram of a UI of a method for using a virtual item according to another exemplary embodiment of this disclosure.
Figure 10:
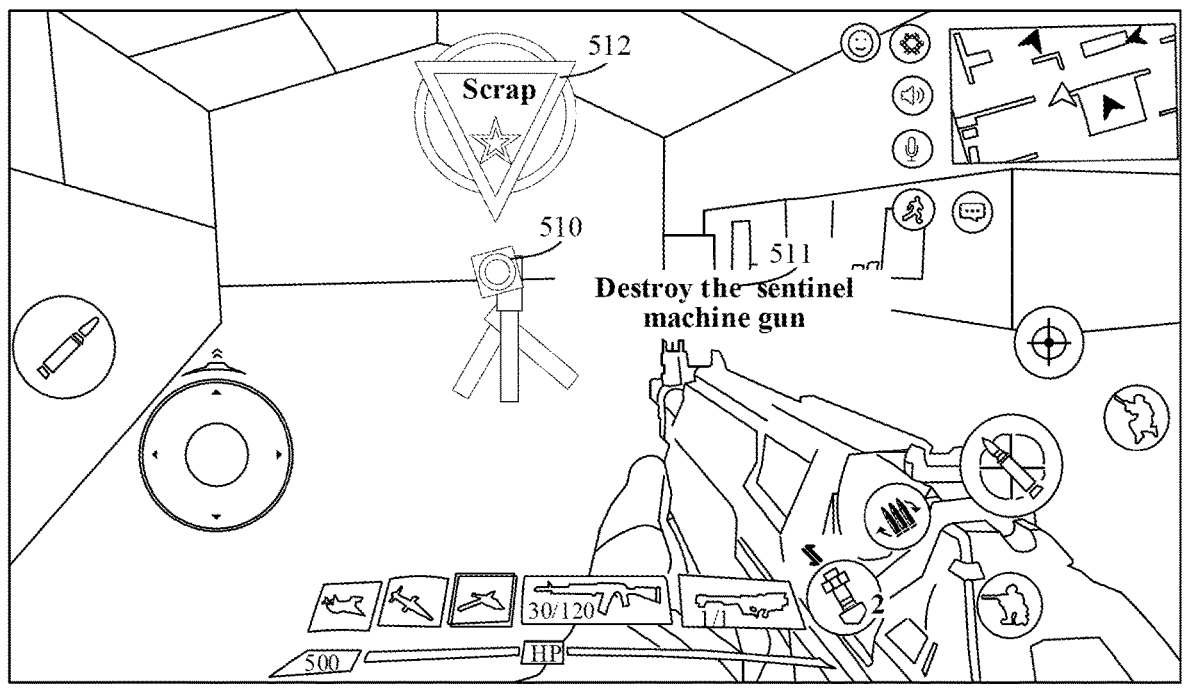
FIG. 10 is a schematic diagram of a UI of a method for using a virtual item according to another exemplary embodiment of this disclosure.

In a possible implementation, when the second virtual item is destroyed by the first virtual item, prompt information indicating that the second virtual item is destroyed is displayed on the UI. Therefore, the second effect includes displaying the prompt information indicating that the second virtual item is destroyed. For example, the prompt information may be at least one of a text prompt, a voice prompt, an image prompt, a VR display prompt, or an AR display prompt. For example, it is assumed that the influence range of the first virtual item is the field of view of the first virtual character. That is, when the first virtual character uses the first virtual item, all virtual items and virtual characters located in the field of view of the first virtual character are targets of the first virtual item. FIG. 9 is a schematic diagram of a UI of a method for using a virtual item according to another exemplary embodiment of this disclosure. As shown in FIG. 9, there is a second virtual item (a sentinel machine gun) 510 in the virtual environment. After the first virtual character uses the first virtual item (the electromagnetic pulse) 506, the second effect (being destroyed) is produced on the second virtual item (the sentinel machine gun) 510. FIG. 10 is a schematic diagram of a UI of a method for using a virtual item according to another exemplary embodiment of this disclosure. As shown in FIG. 10, in response to the second virtual item (the sentinel machine gun) being destroyed, a text prompt 511 of "destroy the sentinel machine gun" is displayed on the UI, and/or a destroy icon 512 is displayed on the UI.

In a possible implementation, there are different types of first virtual items; the different types of first virtual items correspond to different second effects; and the controlling the first virtual item to produce a second effect on the second virtual item includes:

obtaining a type of the first virtual item;

determining the second effect corresponding to the type of the first virtual item; and changing a specified attribute value of the second virtual item based on the second effect corresponding to the type of the first virtual item.

For example, if the first virtual item is used to destroy a virtual item within the influence range, a third attribute value of the virtual item within the influence range of the first virtual item is cleared to zero. If the first virtual item is used to reduce an attribute value of a specific attribute of the second virtual item, for example, reduce a shooting speed of the second virtual item, a shooting speed of a virtual item with a shooting function and within the influence range of the first virtual item is reduced. If the first virtual item is used to increase an attribute value of a specific attribute of the second virtual item, for example, increase the shooting speed of the second virtual item, a shooting speed of a virtual item with a shooting function and within the influence range of the first virtual item is increased.

In a possible implementation, the second effect further includes superimposing and displaying influence prompt information on the first UI based on the second effect corresponding to a type of the second virtual item, the influence prompt information being used for prompting the second effect.

In step 206, in response to a second virtual character being located within the influence range of the first virtual item, the first virtual item is controlled to produce a first effect on the second virtual character, the first effect including generating a damage value that reduces a hit point value of the second virtual character, the damage value being equal to 0 or less than a normal attack damage value.

The first client controls, in response to a second virtual character being located within an influence range of the first virtual item, the first virtual item to produce a first effect on the second virtual character.

For example, the first virtual item produces a first effect on the virtual character within the influence range of the first virtual item. The first effect includes reducing a hit point value of the virtual character. However, the damage caused by the first virtual item to the virtual character is excessively small.

The normal attack damage value is a damage value caused by normal attacks to the virtual character. In a possible implementation, the damage caused by the first virtual item to the virtual character is less than the damage caused by the normal attack to the virtual character. The normal attack refers to a reduced hit point value of the virtual character when hit by another virtual character with bare hands. Alternatively, the normal attack refers to a reduced hit point value of the virtual character when hit by another virtual character with the most basic weapon. The most basic weapon refers to a weapon that the virtual character carries when entering the game. For example, if the virtual character does not carry any weapon when entering the game, the most basic weapon is the hand; or, if the virtual character carries a sword when entering the game, the most basic weapon is the sword, and the normal attack damage is a damage value caused by one sword strike.

In a possible implementation, the first virtual item does not cause damage to the virtual character, that is, the hit point value of the virtual character is reduced to 0 under the first effect.

In a possible implementation, the first virtual item only destroys virtual items within the influence range, and does not produce any effect on virtual characters within the influence range.

The hit point value is used for describing the status of the virtual character. For example, when the hit point value of the virtual character is 0, the virtual character is eliminated, and the game fails. For example, the hit point value may alternatively be a signal value, a status value, a red bar, or the like. The damage value is the reduction in the hit point value of the virtual character when being attacked.

The second virtual character is another virtual character that is active in the virtual environment. For example, the second virtual character may be a virtual character controlled by a second client. For example, the second virtual character may alternatively be a virtual character controlled by the server or AI. For example, the second virtual character may be a virtual character in the same camp as the first virtual character, that is, the second virtual character is a teammate of the first virtual character; or the second virtual character may be a virtual character in an enemy camp of the first virtual character, that is, the second virtual character is an opponent of the first virtual character.

Based on the above, according to the method for using a virtual item provided in the embodiments, a non-harmful virtual item is provided, and when a virtual character uses the virtual item on a heavy weapon, a change of a specified attribute value of the heavy weapon is controlled, so that the user does not need to change the specified attribute value of destroying the heavy weapon by attacking the heavy weapon for a plurality of times, thereby preventing the user from spending too much time, simplifying the process for the user to attack the heavy weapon, simplifying the user operation, and improving the man-machine interaction efficiency. In addition, quickly changing the specified attribute value of the heavy weapon can reduce the server load, speed up the game, and end the game in a shorter time, so that the server can provide more players with the game within a unit time period. The server resources are saved, and the server performance is improved. The server resources during peak periods are saved in particular.

For example, the first virtual item may be a throwing item or a shooting item, and the first virtual item is thrown or shot to a landing point.

Figure 11:
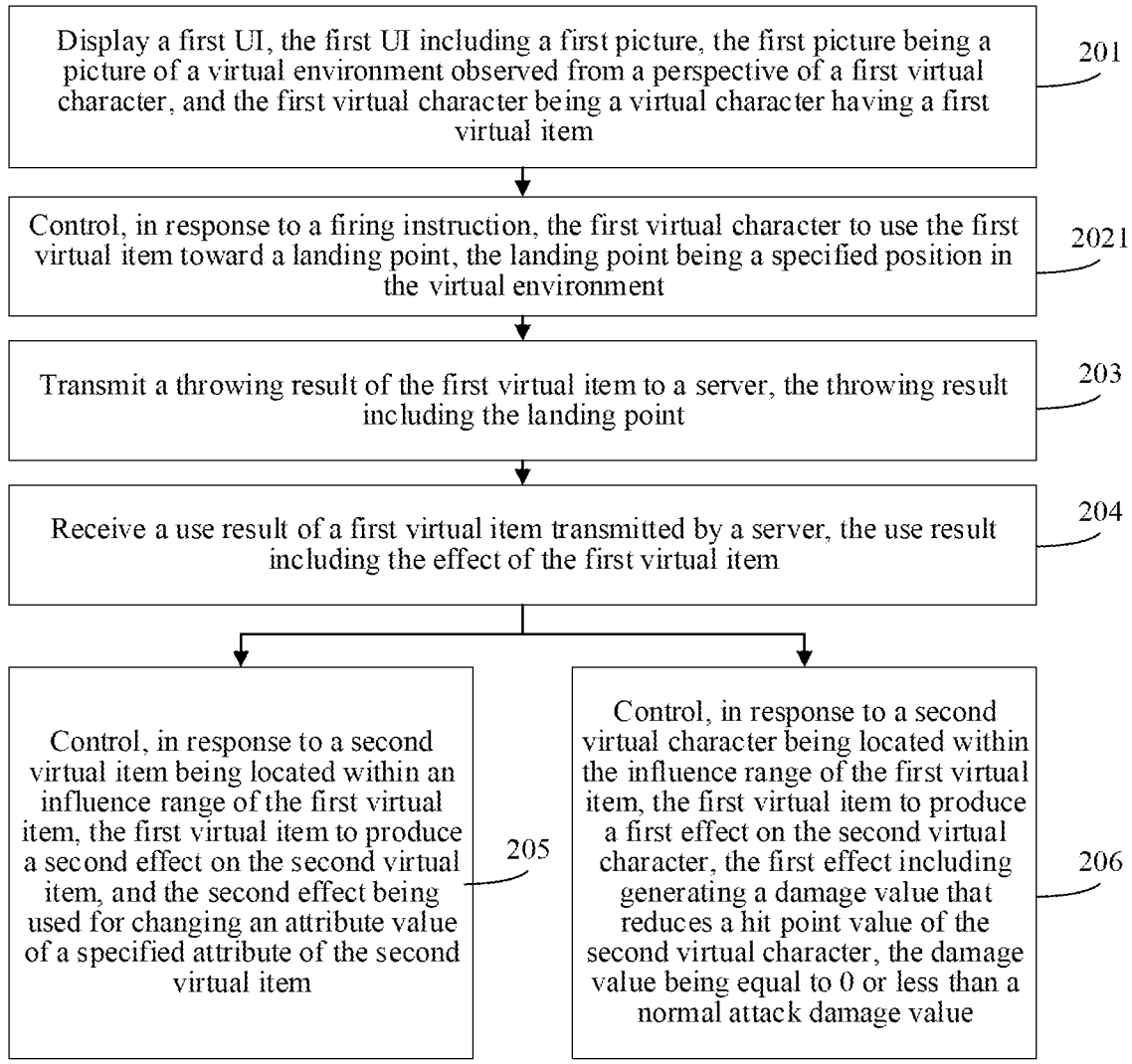
FIG. 11 is a flowchart of a method for using a virtual item according to another exemplary embodiment of this disclosure.

FIG. 11 is a flowchart of a method for a virtual character to use a virtual weapon according to another exemplary embodiment of this disclosure. The method is applicable to the first terminal 120 or the second terminal 160 in the computer system shown in FIG. 1 or another terminal in the computer system. A first client of an application program that supports a virtual environment is installed on the terminal. The difference from the embodiment shown in FIG. 2 is that step 202 includes step 2021, and after step 202, step 203 and step 204 are further included.

In step 2021, in response to a firing instruction, the first virtual character is controlled to use the first virtual item toward a landing point, the landing point is a specified position in the virtual environment. The influence range of the first virtual item is a space range whose distance from the landing point is less than an effective radius.

The first client controls, in response to a firing instruction, the first virtual character to use a first virtual item toward a landing point.

For example, after the first virtual item is used, an effect is produced near the landing point. For example, the first virtual character uses the first virtual item to enable the first virtual item to arrive at the landing point and produce an effect; or, the first virtual character uses the first virtual item to determine the landing point as an influence point of the first virtual item. The first virtual item does not need to reach the landing point to produce an effect at the landing point. The effect of the first virtual item affects a virtual item and/or virtual character near the landing point. For example, after the first virtual character uses the first virtual item, a magic circle is summoned at the landing point, or an airdrop package is summoned at the landing point, or a missile is summoned to attack the landing point.

The landing point is a point in the virtual environment. For example, the landing point is a point selected by the first user, or the landing point is a point calculated by the first client through the operation of the first user using the first virtual item, or the landing point is a point calculated by the first client according to the perspective of the current position of the first virtual character.

Figure 12:
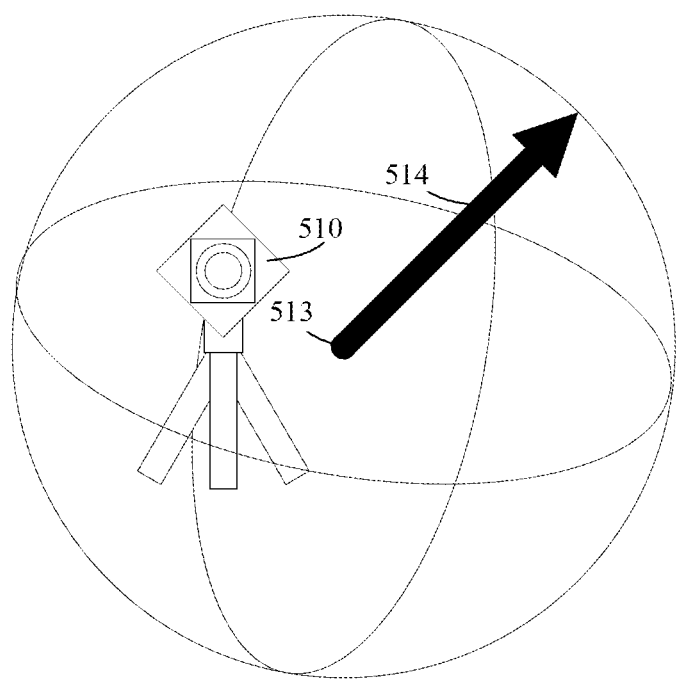
FIG. 12 is a schematic diagram of an influence range according to another exemplary embodiment of this disclosure.

The effective radius is a largest distance within which the first virtual item is capable of producing an effect. For example, the influence range of the first virtual item is a range of a sphere with the landing point as a center and the effective radius as a radius. FIG. 12 is a schematic diagram of an influence range according to another exemplary embodiment of this disclosure. As shown in FIG. 12, the influence range of the first virtual item is a space range whose distance from a landing point 513 is less than an effective radius 514. Since the second virtual item (the sentinel machine gun) 510 is within the influence range of the first virtual item, the first virtual item produces the second effect on the second virtual item (the sentinel machine gun) 510.

Figure 13:
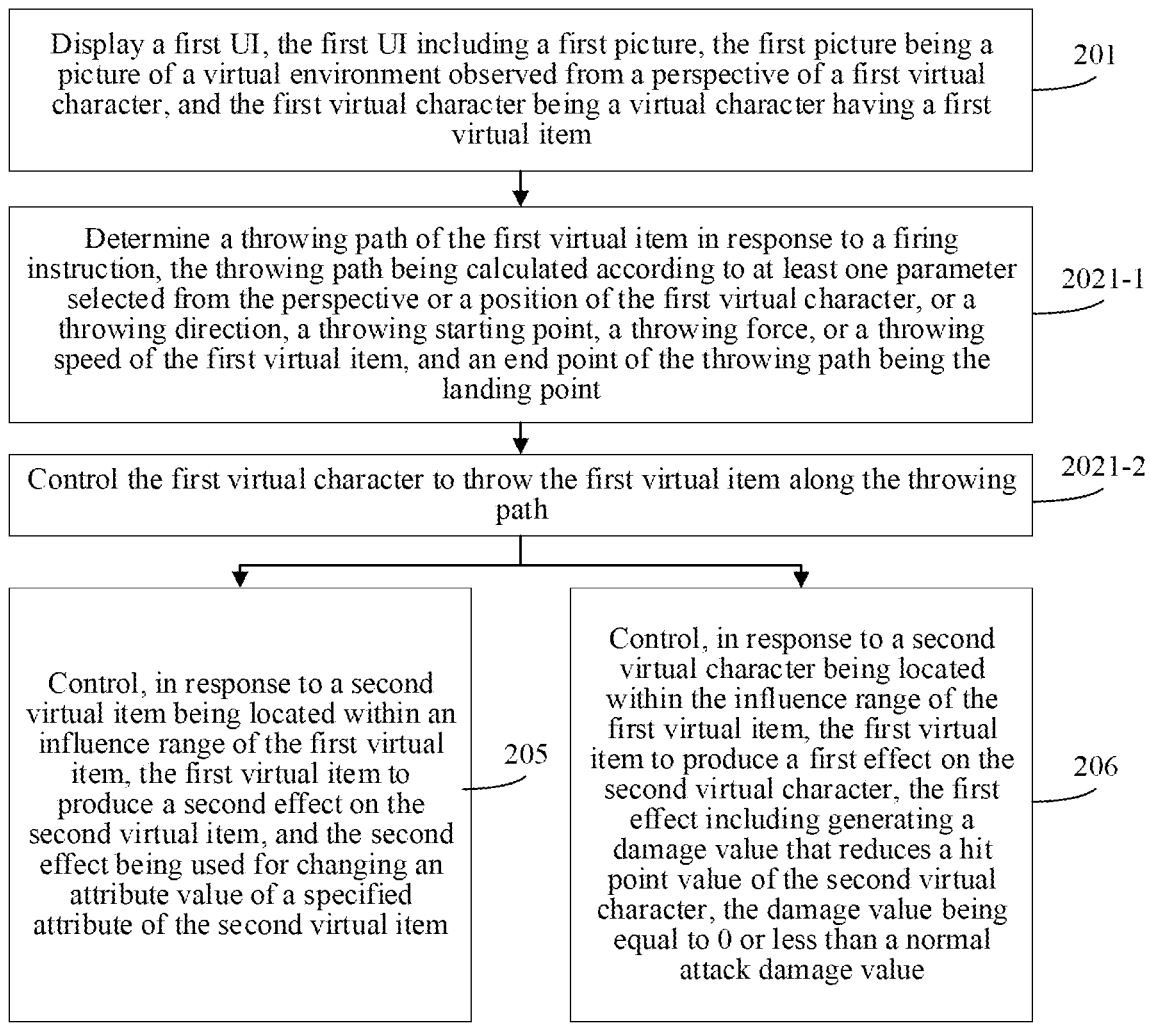
FIG. 13 is a flowchart of a method for using a virtual item according to another exemplary embodiment of this disclosure.

For example, when the first virtual item is a throwing item, FIG. 13 is a flowchart of a method for using a virtual item according to another exemplary embodiment of this disclosure. As shown in FIG. 13, step 2021 includes step 2021-1 and step 2021-2.

In step 2021-1, a throwing path of the first virtual item is determined in response to a firing instruction, the throwing path is calculated according to at least one parameter selected from the perspective or a position of the first virtual character, or a throwing direction, a throwing starting point, a throwing force, or a throwing speed of the first virtual item, and an end point of the throwing path is the landing point.

The first client determines a throwing path of the first virtual item in response to a firing instruction.

For example, when the first virtual item is a throwing item, such as a grenade, a flash grenade, a smoke grenade, or an electromagnetic pulse bomb, the first virtual character uses the first virtual item by throwing the first virtual item. When the first virtual item hits somewhere, the first virtual item produces a corresponding effect.

For example, the first virtual item is thrown along the throwing path. The throwing path is calculated by the first client according to at least one parameter selected from the current perspective or a position of the first virtual character, or a throwing direction, a throwing starting point, a throwing force, or a throwing speed of the first virtual item. For example, when the first virtual character is currently located at (0, 0, 0), the throwing starting point is (0, 0, 10) of the hand of the first virtual character, the throwing direction is (1, 1, 1), and the throwing speed is 5 m/s, the server calculates the throwing path (a parabola) of the first virtual item according to the parameters. For example, the throwing direction is obtained according to the current perspective (a pitch angle and a horizontal deflection angle) of the first virtual character, and the throwing speed and the throwing force may be obtained according to a throwing operation of the first user. For example, the throwing force is determined according to a length of time for the first user to press the firing control, and a longer pressing time indicates a greater throwing force and a larger throwing distance. For example, the throwing path of the first virtual item may alternatively be calculated according to parameters such as a mass and a gravity acceleration of the first virtual item. For example, the throwing path may alternatively be a straight line from the throwing starting point to the landing point.

For example, the first virtual item arrives at the landing point after being thrown along the throwing path.

In step 2021-2, the first virtual character is controlled to throw the first virtual item along the throwing path.

The first client controls the first virtual character to throw the first virtual item along the throwing path, so that the first virtual item arrives at the landing point.

In a possible implementation, both the first client and the server calculate the throwing path of the first virtual item. The first client may throw the first virtual item according to a path result calculated by the first client, or the first client may throw the first virtual item according to a calculation result of the server. In this embodiment of this disclosure, this application is described by taking an example in which the first client throws the first virtual item according to the throwing path calculated by the first client.

Figure 14:
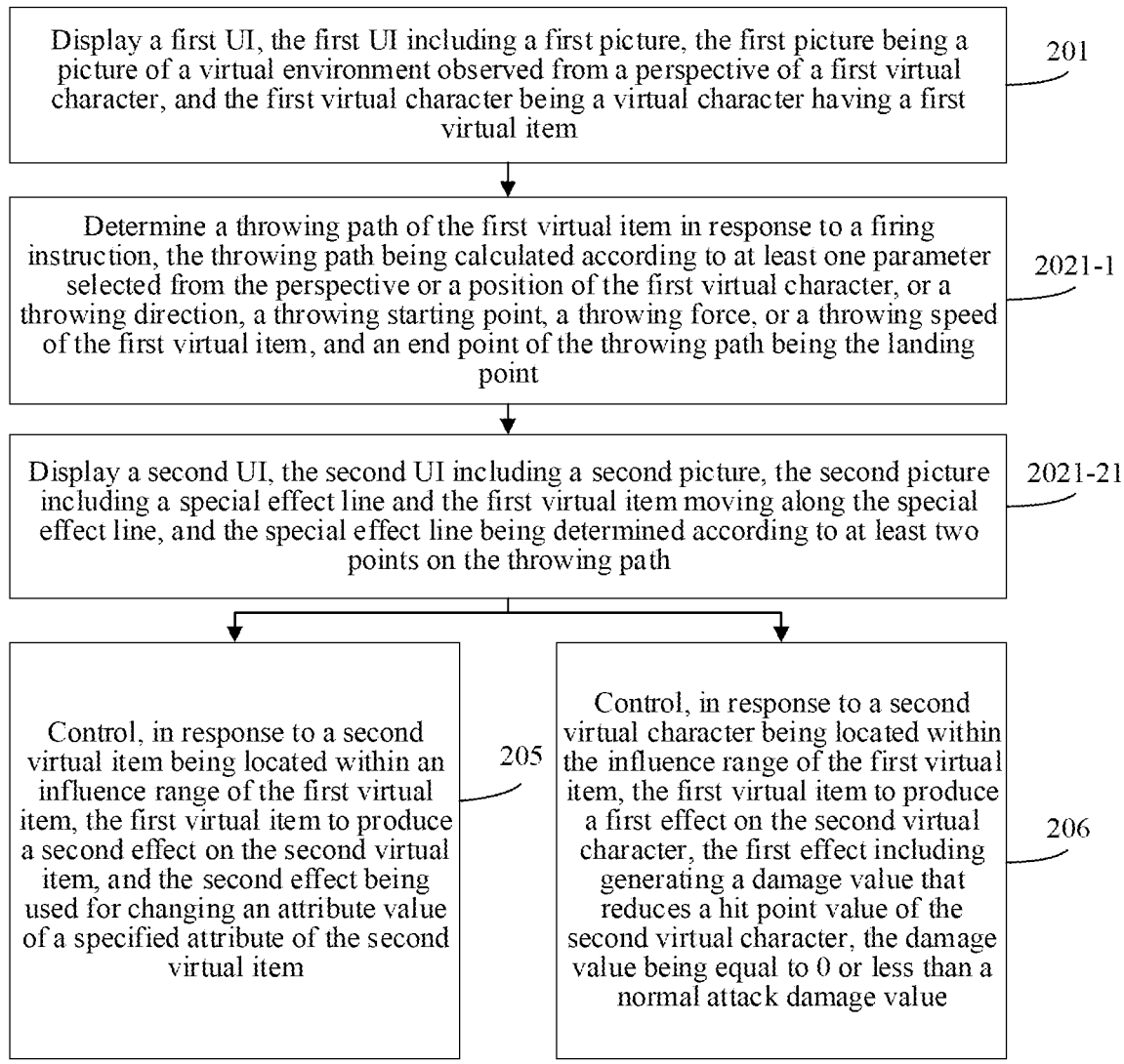
FIG. 14 is a flowchart of a method for using a virtual item according to another exemplary embodiment of this disclosure.

For example, when the first virtual item is a throwing item, a thrown special effect line is displayed when the first virtual item is thrown. FIG. 14 is a flowchart of a method for using a virtual item according to another exemplary embodiment of this disclosure. As shown in FIG. 14, step 2021-2 further includes step 2021-21.

In step 2021-21, a second UI is displayed, the second UI includes a second picture, the second picture includes a special effect line and the first virtual item moving along the special effect line, and the special effect line is determined according to at least two points on the throwing path.

The first client displays the second UI, and the first client is a client corresponding to the first virtual character throwing the first virtual item.

The special effect line is a reference line displayed on the UI to improve the accuracy of the first user to control the first virtual character to throw the first virtual item. In a possible implementation, the special effect line is displayed after the first user is equipped with the first virtual item, and the special effect line changes in real time with the operation of the first user. For example, the special effect line changes in real time with the position movement of the first user and the rotation of the perspective.

In a possible implementation, the special effect line may alternatively be one or more lines displayed on the UI when the first user throws the first virtual item, to show the movement effect of the first virtual item.

In a possible implementation, the special effect line changes as the throwing path changes. In other words, the throwing path is calculated in real time with the operation of the first user, and the corresponding special effect line also changes according to a calculation result of the throwing path. For example, when the first user presses the firing control, the first client calculates the throwing path according to the current state (parameters) of the first virtual character, and renders and displays the special effect line according to the throwing path. When the first user releases the firing control, the first client throws the first virtual item according to the throwing path currently calculated. For example, the first client may alternatively not calculate the throwing path, directly obtain several points on the throwing path calculated according to the calculation method of the throwing path, directly obtain the special effect line according to the points, and throw the first virtual item according to the special effect line.

For example, the special effect line may be equivalent to the throwing path. For example, to simplify the display and improve the rendering speed of the server, the special effect line is a line obtained by selecting specific points from the throwing path and connecting the points. That is, the throwing path is a parabola, and the special effect line is a curve obtained by connecting at least two points on the throwing path.

In a possible implementation, the first virtual item may alternatively be thrown according to the special effect line.

Figure 15:
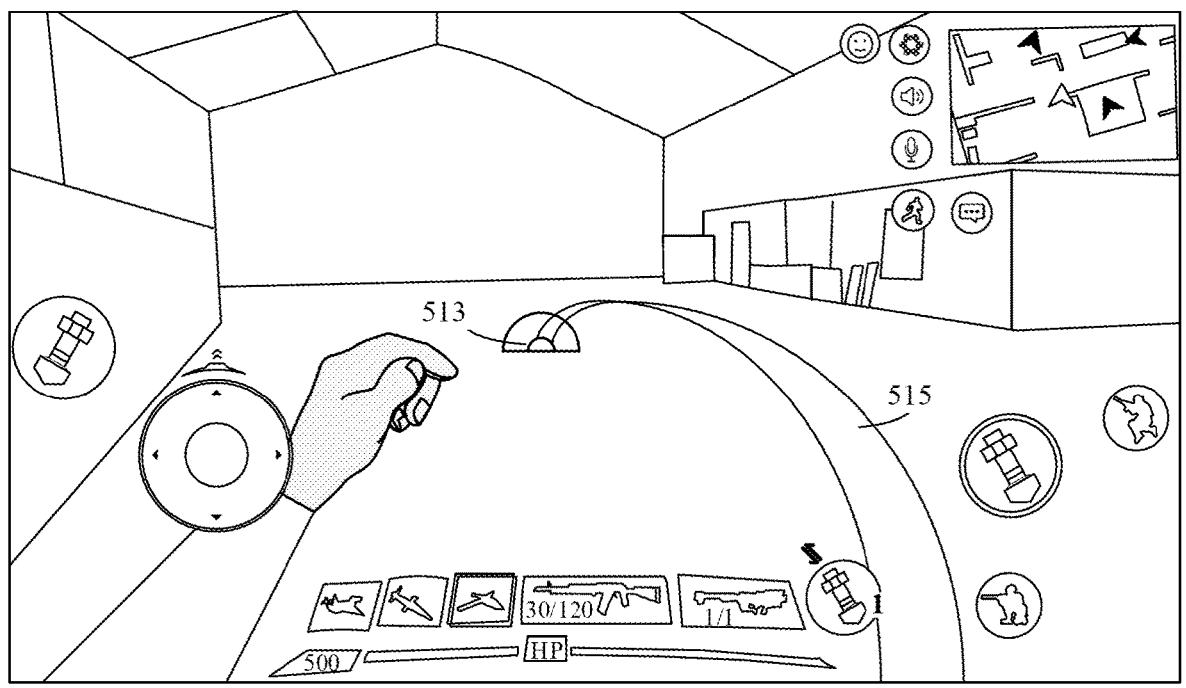
FIG. 15 is a schematic diagram of a UI of a method for using a virtual item according to another exemplary embodiment of this disclosure.

For example, FIG. 15 is a schematic diagram of a UI of a method for using a virtual item according to another exemplary embodiment of this disclosure. As shown in FIG. 15, after the first virtual character uses the first virtual item, a second UI shown in FIG. 15 is displayed. In the second UI, the first virtual item is thrown along a special effect line 515, hits the ground at a landing point 513, and produces an effect on a virtual item and a virtual character near the landing point.

Figure 16:
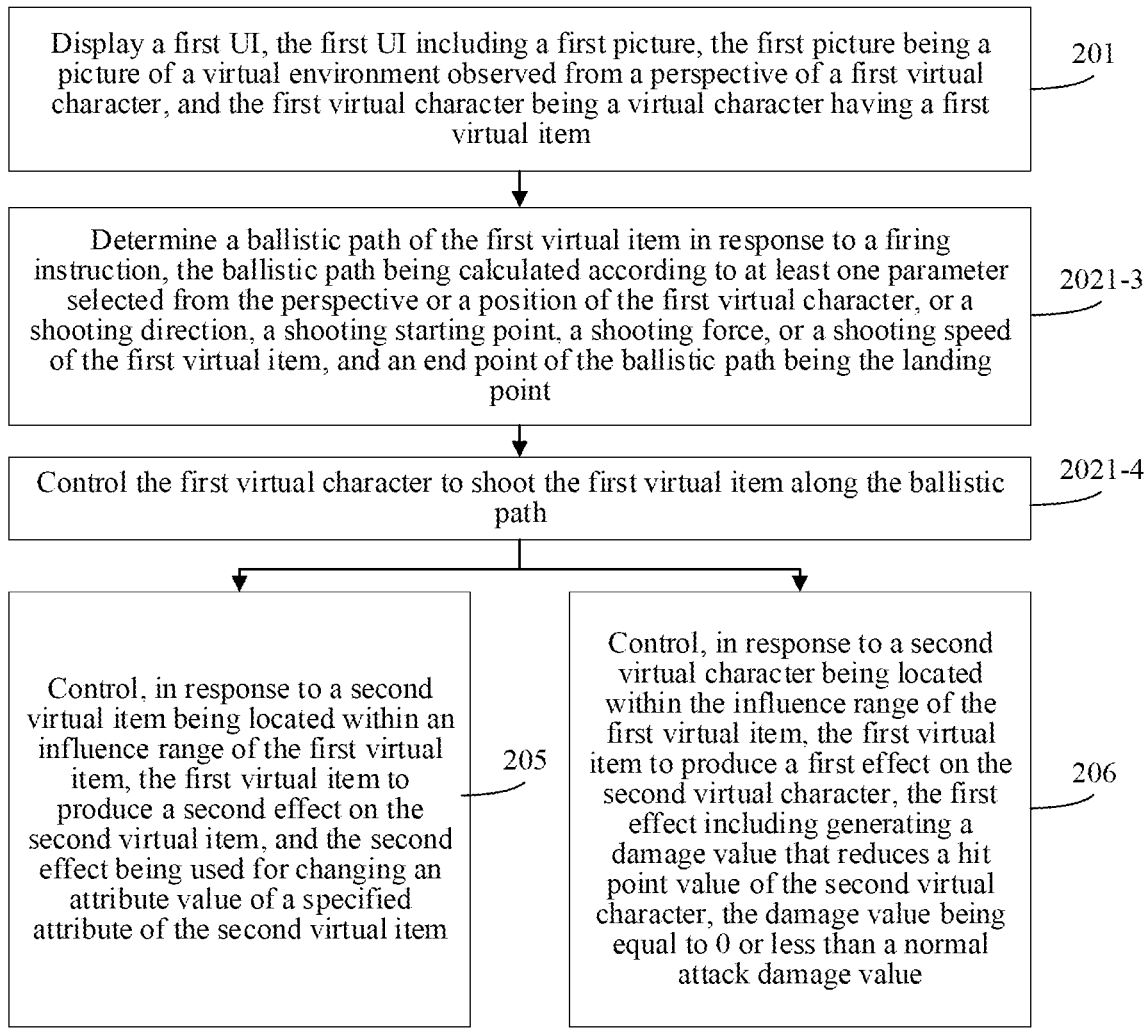
FIG. 16 is a flowchart of a method for using a virtual item according to another exemplary embodiment of this disclosure.

For example, when the first virtual item is a shooting item, FIG. 16 is a flowchart of a method for using a virtual item according to another exemplary embodiment of this disclosure. As shown in FIG. 16, step 2021 includes step 2021-3 and step 2021-4.

In step 2021-3, a ballistic path of the first virtual item is determined in response to a firing instruction, the ballistic path is calculated according to at least one parameter selected from the perspective or a position of the first virtual character, or a shooting direction, a shooting starting point, a shooting force, or a shooting speed of the first virtual item, and an end point of the ballistic path is the landing point.

The first client determines a ballistic path of the first virtual item in response to a firing instruction.

For example, when the first virtual item is a shooting item, such as a pistol, missile, or a machine gun, the first virtual character uses the first virtual item by shooting the first virtual item (a consumable part in the first virtual item). When the first virtual item (the consumable part in the first virtual item) hits somewhere, the first virtual item produces an effect.

For example, the calculation method of the ballistic path is similar to the calculation method of the throwing path. The details are not described in this embodiment. For example, the ballistic path may alternatively be determined according to a parameter of the first virtual item, for example, the firing power of the first virtual item, or the firing method of the consumable part (bullet) of the first virtual item.

In step 2021-4, the first virtual character is controlled to shoot the first virtual item along the ballistic path.

The first client controls the first virtual character to shoot the first virtual item along the ballistic path.

For example, a special effect line corresponding to the ballistic path may be further displayed on the UI.

In step 203, a throwing result of the first virtual item is transmitted to a server, and the throwing result includes the landing point.

The first client transmits a throwing result of the first virtual item to a server.

For example, after obtaining the landing point of the first virtual item, the first client transmits the landing point to the server. For example, the server verifies the validity of the landing point, and returns a use result of the first virtual item to the first client.

In step 204, a use result of a first virtual item transmitted by a server is received, the use result includes the effect of the first virtual item.

The first client receives a use result of a first virtual item transmitted by a server.

For example, after receiving the landing point, the server calculates a distance between each virtual item or virtual character in the virtual environment and the landing point, and determines a virtual item or virtual character whose distance is less than an effective radius as a target of the first virtual item. For example, the server determines whether the first virtual item produces the first effect or the second effect on the target according to whether the target is a virtual item or a virtual character, determines the effect as the use result, and transmits the use result to the first client.

For example, the use result includes the second effect on the second virtual item, and/or the first effect on the second virtual character.

For example, the first effect on the second virtual character in step 206 further includes an activity limitation of the second virtual character, and the activity limitation of the second virtual character includes at least one of movement speed reduction, line-of-sight obstruction, slow activity, control manner change, item use limitation, or movement manner limitation of the second virtual character.

For example, the second effect produced by the first virtual item on the virtual character further includes an activity limitation of the second virtual character. For example, some state values of the second virtual character are changed, such as the movement speed, a blood regeneration speed, and the field of view. Alternatively, a use permission of the second virtual character is changed, for example, incapability of opening the scope, incapability of squatting, incapability of accelerated movement, incapability of using items, incapability of firing, incapability of switching perspectives, or incapability of transmitting signals. Alternatively, part of the picture or control is occluded on the UI of the second client corresponding to the second virtual character, which affects the control of the second virtual character by the second user. FIG. 17 is a schematic diagram of a UI of a method for using a virtual item according to another exemplary embodiment of this disclosure. As shown in FIG. 17, the UI is the UI displayed on the second client corresponding to the second virtual character within the influence range of the first virtual item. On the UI, a UI control is covered by a mosaic 516, so that the second user cannot see the position of the UI control clearly, thereby restricting the control of the second virtual character by the second user, and reducing the accuracy of control of the second virtual character by the second user.

Based on the above, according to the method provided in the embodiments, the first virtual item can produce an effect on all virtual characters and virtual items within a specific range, a landing point of the first virtual item is obtained, and a virtual item or virtual character that can be affected by the first virtual item is obtained according to a first landing point. The influence range of the first virtual item is expanded, and the hit probability of the first virtual item is increased.

According to the method provided in the embodiments, the first client calculates a throwing route of the first virtual item according to at least one parameter selected from the perspective of the first virtual character, the throwing direction, the position of the first virtual character, the throwing starting point, the throwing speed, or the throwing force, thereby obtaining the final landing point of the first virtual item. The user can adjust the throwing path of the first virtual item by adjusting the plurality of parameters to obtain different landing points, thereby improving the controllability of the first virtual item.

According to the method provided in the embodiments, the first client further obtains several points on the throwing path according to the throwing path when the first virtual item is thrown, uses the several points to obtain the special effect line, and displays the special effect line on the UI, so that the user can see the throwing path of the first virtual item, thereby improving the display effect of the throwing process of the first virtual item.

According to the method provided in the embodiments, after obtaining the landing point, the first client transmits the landing point to the server, and the server calculates the use result of the first virtual item according to the landing point. The use result of the first virtual item is transmitted to each client through the server.

According to the method provided in the embodiments, after receiving the landing point, the server calculates the use result of the first virtual item according to the landing point, and returns the use result to the first client. The use result includes the effect of the first virtual item. The effect includes at least one of the first effect or the second effect. The first client responds correspondingly based on the received use result. For example, after receiving the use result, the first client correspondingly displays that the second virtual item is destroyed.

According to the method provided in the embodiments, after the first virtual item hits the second virtual character, the hit point value of the second virtual character is not reduced too much, but the normal activities of the second virtual character can be affected, for example, movement speed reduction, line-of-sight obstruction, slow activity, control manner change, item use limitation, or movement manner limitation of the second virtual character. Therefore, the first virtual item can also act on a virtual character, and the use manners of the first virtual item are expanded.

For example, this disclosure further provides an exemplary embodiment in which the second virtual character is attacked by the first virtual item.

FIG. 18 is a flowchart of a method for using a virtual item according to another exemplary embodiment of this disclosure. The method is applicable to the first terminal 120 or the second terminal 160 in the computer system shown in FIG. 1 or another terminal in the computer system. A second client of an application program that supports a virtual environment is installed on the terminal. The method includes the following steps:

In step 207, a third UI is displayed, the third UI includes a third picture and a man-machine interaction control (also referred to as a user interaction control component) at a first position, and the third picture is a picture of a virtual environment observed from a perspective of a second virtual character.

The second client displays the third UI, and the second client is a client corresponding to the second virtual character within the influence range of the first virtual item.

Figure 19:
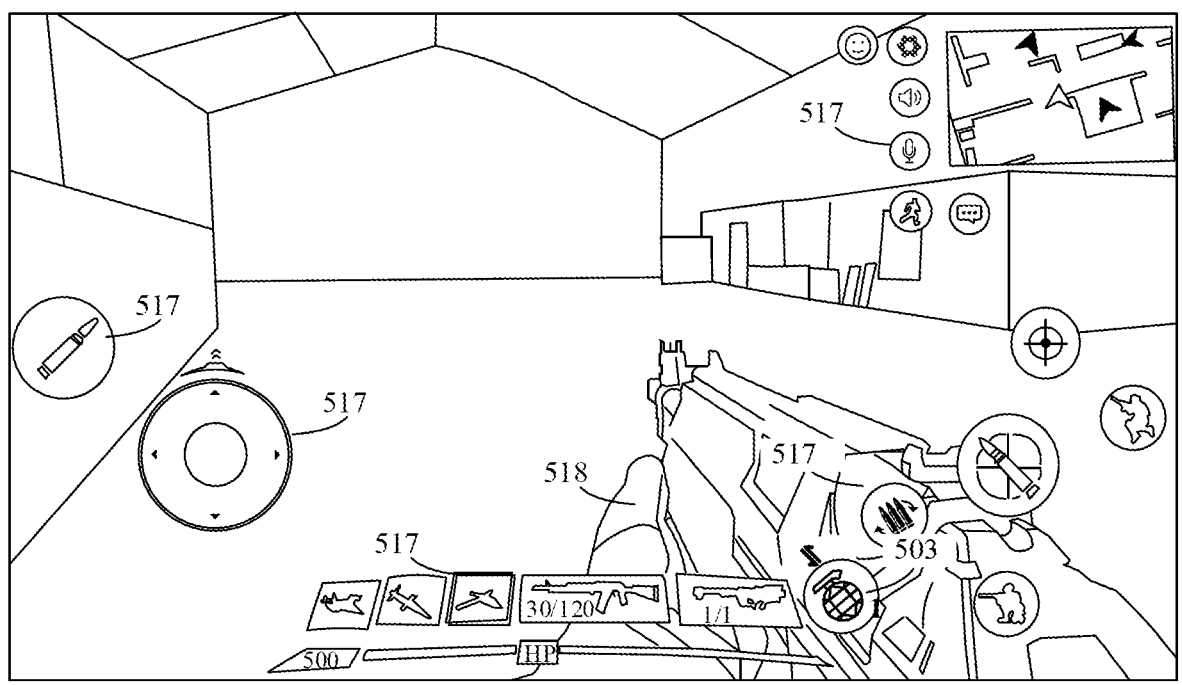
FIG. 19 is a schematic diagram of a UI of a method for using a virtual item according to another exemplary embodiment of this disclosure.

For example, FIG. 19 is a schematic diagram of a UI of a method for using a virtual item according to another exemplary embodiment of this disclosure. As shown in FIG. 19, a schematic diagram of a third UI is provided, and at least one man-machine interaction control 517 is displayed at a first position. The man-machine interaction control is a type of UI control. The man-machine interaction control can generate a corresponding instruction based on a received user operation, and the client responds to the instruction.

The third picture is a picture of the virtual environment observed from the perspective of the second virtual character. For example, as shown in FIG. 19, a third picture is displayed on the third UI, and a hand 518 of the second virtual character is displayed in the third picture.

In step 208, a use result of a first virtual item transmitted by a server is received.

The second client receives a use result of a first virtual item transmitted by a server.

For example, the use result is a use result of the first virtual item obtained by the server after the first virtual character uses the first virtual item. The use result may be a use result of the first virtual item acting on the second virtual item; or may be a use result of the first virtual item acting on the second virtual character. If the second virtual character is within the influence range of the first virtual item, the second virtual character is affected by the first virtual item. Therefore, the use result includes the first effect produced by the first virtual item on the second virtual character.

In a possible implementation, the second virtual character is within the influence range of the first virtual item, the use result includes a first effect produced by the first virtual item on the second virtual character, the first effect includes an activity limitation of the second virtual character, and the activity limitation of the second virtual character includes at least one of movement speed reduction, line of sight obstruction, slow activity, control manner change, item use limitation, or movement manner limitation of the second virtual character.

In step 209, a fourth UI in response to the use result is received, the fourth UI includes a fourth picture and an occlusion region at the first position, the fourth picture is a picture of the virtual environment observed from the perspective of the second virtual character, and the occlusion region is used for covering part of or the entire man-machine interaction control.

The second client displays the fourth UI in response to the use result.

The occlusion region is used for occluding the man-machine interaction control.

In a possible implementation, the occlusion region may be a picture to cover the man-machine interaction control, or may be a fuzzy display of the man-machine interaction control.

For example, as shown in FIG. 17, there is a occlusion region 519 at the first position. For example, the mosaic 516 is superimposed and displayed on the occlusion region 519, and the mosaic 516 occludes part of or the entire man-machine interaction control.

In step 210, in response to receiving a control instruction based on the man-machine interaction control, the second virtual character is controlled to move in the virtual environment, the control instruction being generated according to a trigger operation received on the man-machine interaction control in the occlusion region.

The second client controls, in response to receiving a control instruction based on the man-machine interaction control, the second virtual character to move in the virtual environment.

For example, the man-machine interaction control is occluded by the occlusion region, which does not affect the man-machine interaction control to receive a user operation. The second user can still perform a corresponding operation at a corresponding position, and the man-machine interaction control generates an instruction according to the operation. That is, the effect of the first virtual item is only to occlude the display of the man-machine interaction control on the second client corresponding to the second virtual character, and does not affect the normal function of the man-machine interaction control. For example, the occlusion effect of the occlusion region automatically returns to normal after a specific condition is met. For example, after a period of time, or after the second virtual character moves by a specific distance (for example, the second virtual character leaves the influence range of the first virtual item), the occlusion region disappears, and the man-machine interaction control is normally displayed at the first position on the UI.

In a possible implementation, according to a distance between the second virtual character and the landing point of the first virtual item, the occlusion effect of the first virtual character on the man-machine interaction control in the second client corresponding to the second virtual character is determined. A shorter distance between the second virtual character and the landing point of the first virtual item indicates a better occlusion effect of the occlusion region on the man-machine interaction control (for example, a denser mosaic). A longer distance between the second virtual character and the landing point of the first virtual item indicates a poorer occlusion effect of the occlusion region on the man-machine interaction control (for example, the mosaic becomes sparser until disappearing).

For example, the third UI further includes a first hit point value of the second virtual character; and the fourth UI further includes a second hit point value of the second virtual character, the second hit point value being less than the first hit point value, a difference between the first hit point value and the second hit point value being equal to a damage value, and the damage value being equal to 0 or less than a normal attack damage value.

For example, the first effect produced by the first virtual item on the second virtual character further includes reducing the hit point value of the second virtual character. For example, since the man-machine interaction control on the fourth UI is occluded by the occlusion region, the second hit point value of the second virtual character on the fourth UI may be occluded. When the occlusion region disappears, the second hit point value of the second virtual character can be seen on the UI.

Based on the above, according to the method provided in the embodiments, when the second virtual character is attacked by the first virtual item, the occlusion region is controlled to be formed on the UI to occlude the man-machine interaction control (component), so that the user cannot see the accurate position of the man-machine interaction control, thereby affecting the normal activities of the second virtual character in the virtual world. Therefore, the first virtual item can also act on a virtual character, and the use manners of the first virtual item are expanded.

According to the method provided in the embodiments, the hit point value of the second virtual character does not change significantly after being attacked by the first virtual item, that is, the first virtual item does not cause substantial damage to the second virtual character, and only limits the activity of the second virtual character.

According to the method provided in the embodiments, after the first virtual item hits the second virtual character, the hit point value of the second virtual character is not reduced too much, but the normal activities of the second virtual character can be affected, for example, movement speed reduction, line-of-sight obstruction, slow activity, control manner change, item use limitation, or movement manner limitation of the second virtual character. Therefore, the first virtual item can also act on a virtual character, and the use manners of the first virtual item are expanded.

According to the method provided in the embodiments, after calculating the use result of the first virtual item, the server transmits the use result to clients corresponding to all virtual characters in the virtual environment. After receiving the use result, the clients corresponding display the use result.

According to the method provided in the embodiments, the server receives the landing point transmitted by the first client, calculates the use result of the first virtual item according to the landing point, and transmits the use result to each client. The server calculates the use result of the first virtual item to avoid inaccurate calculations of the terminal or plug-in programs that affect the fairness of the game.

According to the method provided in the embodiments, the server obtains virtual items and virtual characters that are affected by the first virtual item in the virtual environment according to the landing point and the effective radius of the first virtual item. A distance between each virtual character or virtual item and the landing point is calculated, a virtual item or virtual character whose distance is less than the effective radius is screened out, and the use result of the first virtual item is determined according to the effect of the first virtual item, so that the first virtual item can produce the effect on both virtual items and virtual characters within the specific radius, expanding the influence range of the virtual item, and increasing the hit probability of the first virtual item.

Figure 20:
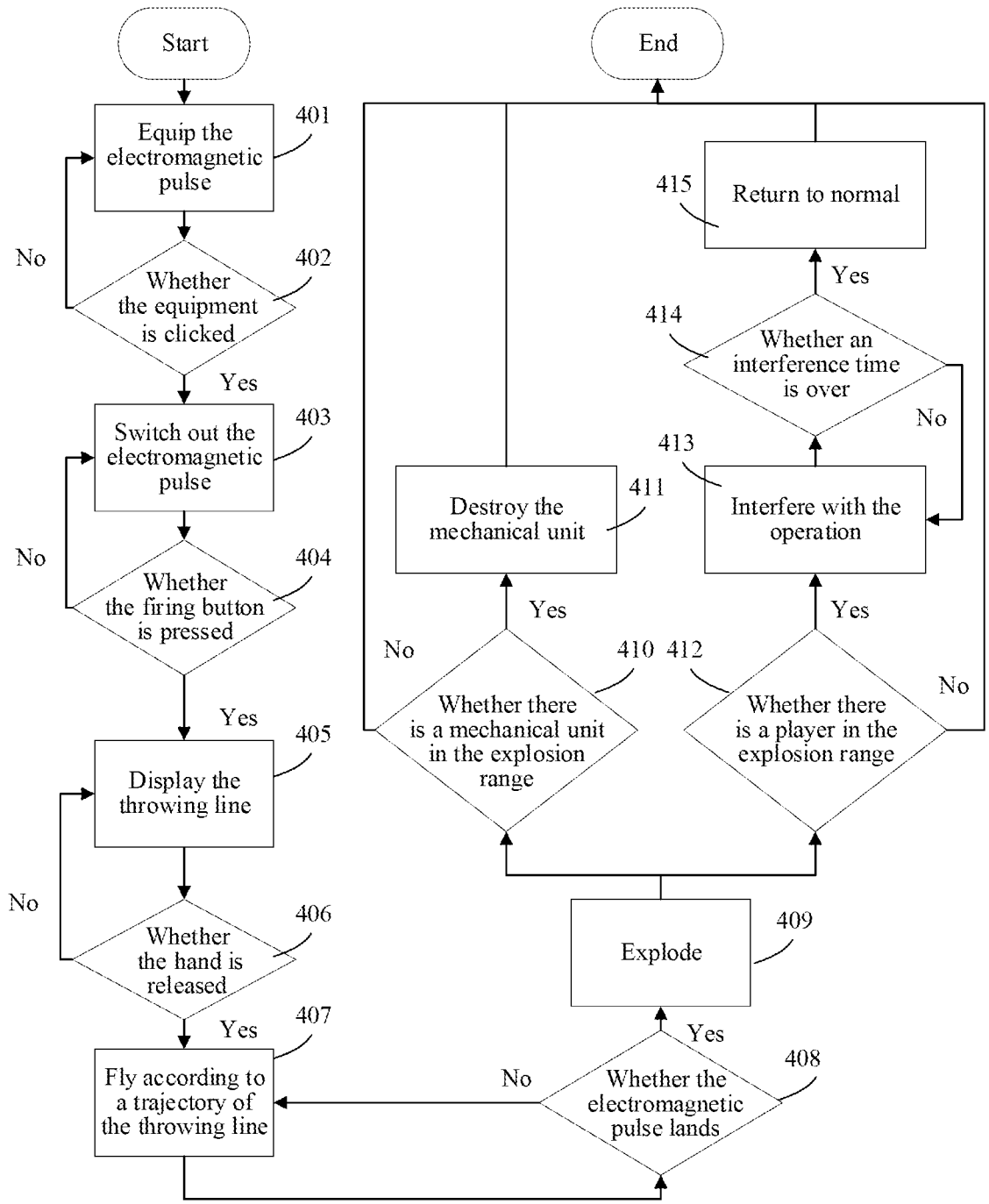
FIG. 20 is a flowchart of a method for using a virtual item according to another exemplary embodiment of this disclosure.

FIG. 20 is a flowchart of a method for using a virtual item according to another exemplary embodiment of this disclosure. The method is applicable to the first terminal 120 or the second terminal 160 in the computer system shown in FIG. 1 or another terminal in the computer system. The method includes the following steps:

In step 40, the first client controls the first virtual character to be equipped with an electromagnetic pulse before entering the game.

For example, the electromagnetic pulse is a type of first virtual item.

In step 402, the first client determines whether the first user clicks on the electromagnetic pulse equipment. If the first user clicks on the electromagnetic pulse equipment, step 403 is performed; otherwise, step 401 is performed.

For example, the first client determines whether the first user is to control the first virtual character to be equipped with the electromagnetic pulse equipment. If the first virtual character is to be equipped with the electromagnetic pulse equipment, the equipment currently held by the first virtual character is replaced with the electromagnetic pulse equipment.

In step 403, the first client switches out the electromagnetic pulse.

In step 404, the first client determines whether the first user presses a firing button. If the firing button is pressed, step 405 is performed; otherwise, step 403 is performed.

In step 405, the first client displays a throwing line.

After the first user presses the firing button, the first client calculates and displays the throwing line (special effect line) on the UI in real time.

In step 406, the first client determines whether the first user releases the hand. If the first user releases the hand, step 407 is performed; otherwise, step 405 is performed.

When the first user releases the firing button, the first client throws the electromagnetic pulse equipment according to the current throwing line.

In step 407, the first client controls the electromagnetic pulse to fly out according to a trajectory of the throwing line.

In step 408, the first client determines whether the electromagnetic pulse lands. If the electromagnetic pulse lands, step 409 is performed; otherwise, step 407 is performed.

The first client determines whether the electromagnetic pulse lands, and obtains a landing point if the electromagnetic pulse lands.

In step 409, the first client controls the electromagnetic pulse to explode.

The first client controls the electromagnetic pulse to explode at the landing point.

In step 410, the first client determines whether there is a mechanical unit in an explosion range. If there is a mechanical unit in the explosion range, step 411 is performed; otherwise, the process ends.

For example, the mechanical unit is a second virtual item.

In step 411, the first client destroys the mechanical unit.

In step 412, the first client determines whether there is a player in the explosion range. If there is a player in the explosion range, step 413 is performed; otherwise, the process ends.

For example, the player is a second virtual character.

In step 413, the server interferes with an operation of the player.

For example, the server controls the second client to occlude the UI control on the UI with mosaics.

In step 414, the server determines whether an interference time is over. If the interference time is over, step 415 is performed; otherwise, step 413 is performed.

In step 415, the server controls the player to return to normal.

Based on the above, according to the method provided in the embodiments, a first virtual item dedicated to destroying other virtual items is provided, and when a virtual character uses the virtual item on a heavy weapon, a change of a specified attribute value of the heavy weapon is controlled, so that the user does not need to change the specified attribute value of destroying the heavy weapon by attacking the heavy weapon for a plurality of times, thereby preventing the user from spending too much time, and simplifying the process for the user to attack the heavy weapon. The user operation is simplified, and the man-machine interaction efficiency is improved.

The following is an apparatus embodiment of this disclosure. For details not described in detail in the apparatus embodiment, reference may be made to corresponding record in the foregoing method embodiments. Details are not described herein again.

Figure 21:
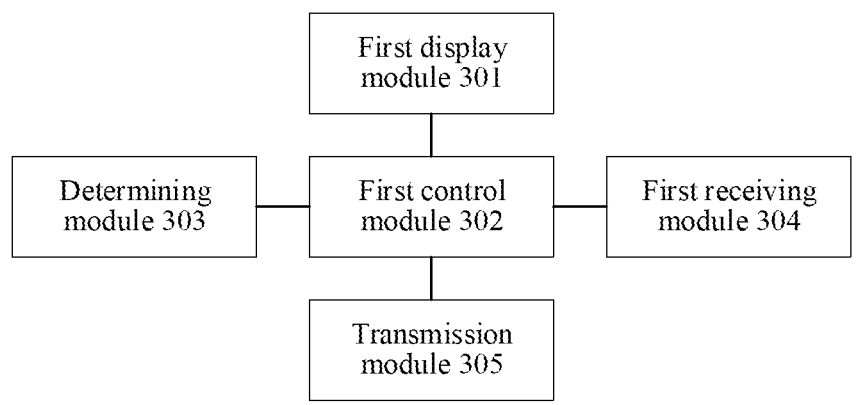
FIG. 21 is a schematic diagram of an apparatus for using a virtual item according to an exemplary embodiment of this disclosure.

FIG. 21 is a schematic structural diagram of an apparatus for using a virtual item according to an exemplary embodiment of this disclosure. The apparatus may be implemented as an entire terminal or a part of a terminal by using software, hardware, or a combination thereof. The apparatus includes a first display module 301, and a first control module 302. One or more modules of the apparatus can be implemented by processing circuitry, software, or a combination thereof, for example.

The first display module 301 is configured to display a first UI, the first UI including a first picture, the first picture being a picture of a virtual environment observed from a perspective of a first virtual character, and the first virtual character is a virtual character having a first virtual item.

The first control module 302 is configured to control, in response to a firing instruction, the first virtual character to use the first virtual item.

The first control module 302 is configured to control, in response to a second virtual item being located within an influence range of the first virtual item, the first virtual item to produce a second effect on the second virtual item, the second effect being used for changing an attribute value of a specified attribute of the second virtual item.

The first control module 302 is configured to control, in response to a second virtual character being located within the influence range of the first virtual item, the first virtual item to produce a first effect on the second virtual character, the first effect includes generating a damage value that reduces a hit point value of the second virtual character, the damage value is equal to 0 or less than a normal attack damage value, and the influence range is a range within which the first virtual item is capable of producing an effect.

In an embodiment, the second effect includes any one of destroying the second virtual item, reducing an attribute value of a first specified attribute of the second virtual item, or increasing an attribute value of a second specified attribute of the second virtual item; and the destroying the second virtual item refers to deducting an attribute value of a third specified attribute of the second virtual item, the third specified attribute being used for implementing an original function of the second virtual item.

In an embodiment, there are different types of first virtual items; the different types of first virtual items correspond to different second effects; and the first control module 302 is configured to obtain a type of the first virtual item, determine the second effect corresponding to the type of the first virtual item and change a specified attribute value of the second virtual item based on the second effect corresponding to the type of the first virtual item.

In an embodiment, the apparatus includes a prompt information display module that is configured to superimpose and display influence prompt information on the first UI based on the second effect corresponding to a type of the second virtual item, the influence prompt information is used for prompting the second effect.

In an embodiment, the first control module 302 is further configured to control the first virtual character to use the first virtual item toward a landing point, the landing point is a specified position in the virtual environment, and the influence range of the first virtual item is a space range whose distance from the landing point is less than an effective radius.

In an embodiment, the first virtual item is a throwing item; the apparatus further includes a determining module 303. The determining module 303 is configured to determine a throwing path of the first virtual item, the throwing path is calculated according to at least one parameter selected from the perspective or a position of the first virtual character, or a throwing direction, a throwing starting point, a throwing force, or a throwing speed of the first virtual item, and an end point of the throwing path is the landing point. The first control module 302 is further configured to control the first virtual character to throw the first virtual item along the throwing path.

In an embodiment, the first virtual item is a shooting item. The determining module 303 is further configured to determine a ballistic path of the first virtual item, the ballistic path being calculated according to at least one parameter selected from the perspective or a position of the first virtual character, or a shooting direction, a shooting starting point, a shooting force, or a shooting speed of the first virtual item, and an end point of the ballistic path is the landing point. The first control module 302 is further configured to control the first virtual character to shoot the first virtual item along the ballistic path.

In an embodiment, the first display module 301 is further configured to display a second UI, the second UI including a second picture, the second picture includes a special effect line and the first virtual item moving along the special effect line, and the special effect line is determined according to at least two points on the throwing path.

In an embodiment, the apparatus further includes a transmission module 305 and a first receiving module 304.

The transmission module 305 is configured to transmit a throwing result of the first virtual item to a server, the throwing result including the landing point.

The first receiving module 304 is configured to receive a use result of the first virtual item transmitted by the server, the use result including the effect of the first virtual item, and the effect includes the first effect and the second effect.

In an embodiment, the first effect further includes an activity limitation of the second virtual character, and the activity limitation of the second virtual character includes at least one of movement speed reduction, line-of-sight obstruction, slow activity, control manner change, item use limitation, or movement manner limitation of the second virtual character.

The following is an apparatus embodiment of this disclosure. For details not described in detail in the apparatus embodiment, reference may be made to corresponding record in the foregoing method embodiments. Details are not described herein again.

Figure 22:
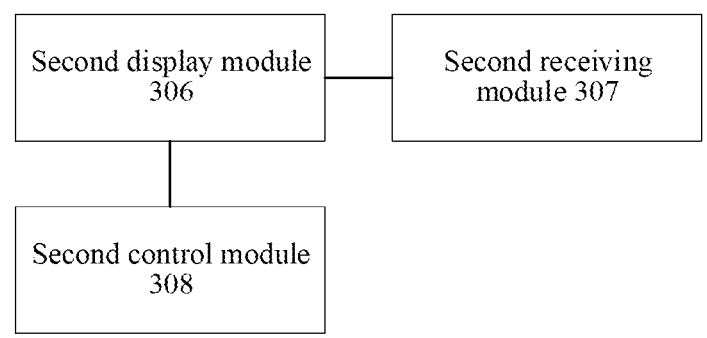
FIG. 22 is a schematic diagram of an apparatus for using a virtual item according to another exemplary embodiment of this disclosure.

FIG. 22 is a schematic structural diagram of an apparatus for using a virtual item according to another exemplary embodiment of this disclosure. The apparatus may be implemented as an entire terminal or a part of a terminal by using software, hardware, or a combination thereof. The apparatus includes a second display module 306, and a second receiving module 307. One or more modules of the apparatus can be implemented by processing circuitry, software, or a combination thereof, for example.

The second display module 306 is configured to display a third UI, the third UI including a third picture and a man-machine interaction control at a first position, and the third picture is a picture of a virtual environment observed from a perspective of a second virtual character.

The second receiving module 307 is configured to receive a use result of a first virtual item transmitted by a server.

The second display module 306 is configured to display a fourth UI in response to the use result, the fourth UI including a fourth picture and an occlusion region at the first position, the fourth picture is a picture of the virtual environment observed from the perspective of the second virtual character, and the occlusion region is used for covering part of or the entire man-machine interaction control.

In an embodiment, the apparatus further includes a second control module 308.

The second control module 308 is configured to control, in response to receiving a control instruction based on the man-machine interaction control, the second virtual character to move in the virtual environment, the control instruction is generated according to a trigger operation received on the man-machine interaction control in the occlusion region.

In an embodiment, the third UI further includes a first hit point value of the second virtual character; and the fourth UI further includes a second hit point value of the second virtual character, the second hit point value is less than the first hit point value, a difference between the first hit point value and the second hit point value is equal to a damage value, and the damage value being equal to 0 or less than a normal attack damage value.

In an embodiment, the use result includes a first effect produced by the first virtual item on the second virtual character, the first effect includes an activity limitation of the second virtual character, and the activity limitation of the second virtual character includes at least one of movement speed reduction, line of sight obstruction, slow activity, control manner change, item use limitation, or movement manner limitation of the second virtual character.

Figure 23:
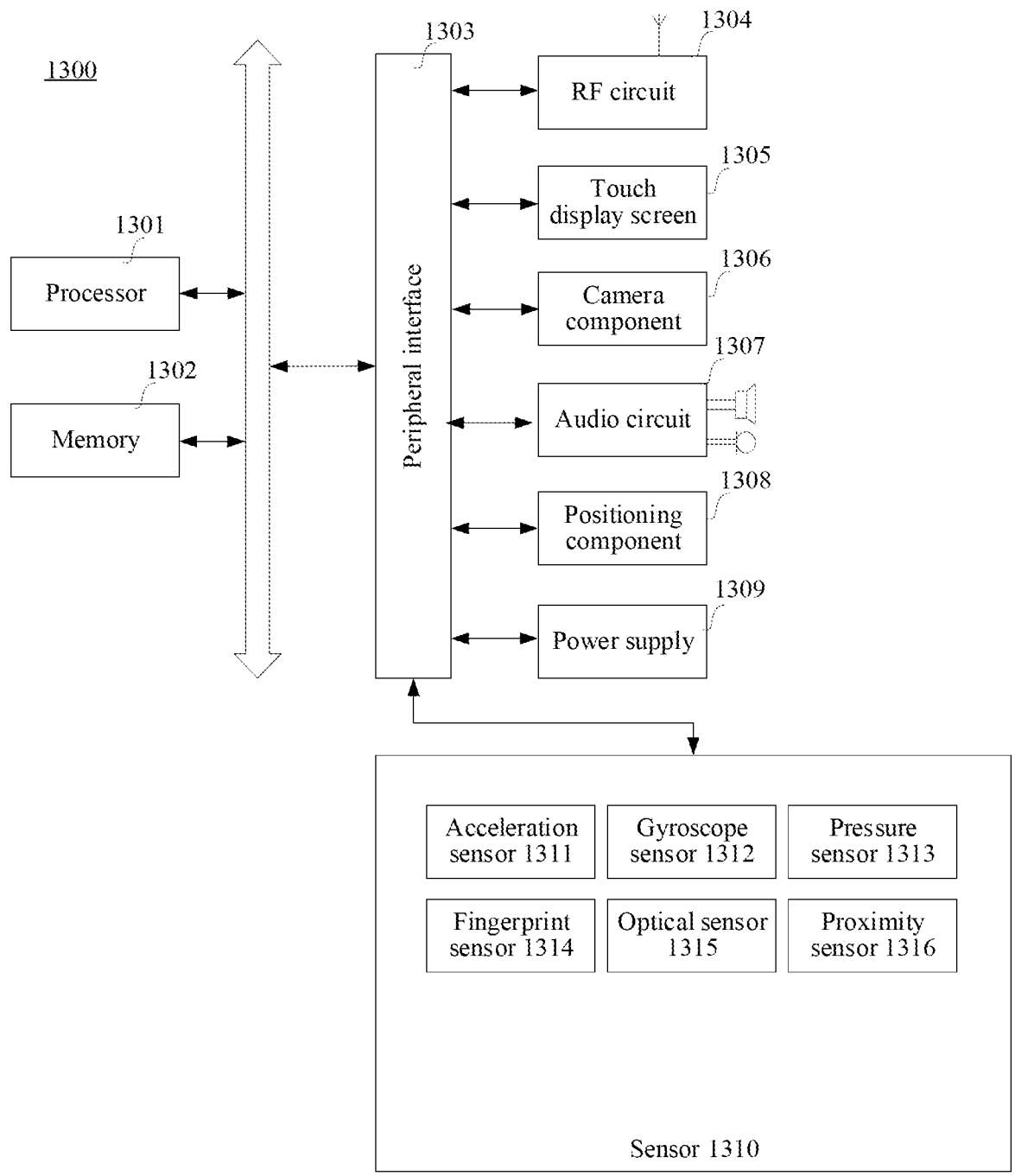
FIG. 23 is a schematic structural diagram of a computer device according to an exemplary embodiment of this disclosure.

FIG. 23 is a structural block diagram of a computer device 1300 according to an exemplary embodiment of this disclosure. The computer device 1300 may be a portable mobile terminal, such as a smartphone, a tablet computer, an MP3 player, or an MP4 player. The computer device 1300 may also be referred to as another name such as user equipment or a portable terminal.

Generally, the computer device 1300 includes a processor 1301 and a memory 1302.

The processor 1301 may include one or more processing cores, for example, a 4-core processor or an 8-core processor. The processor 1301 may be implemented by processing circuitry such as in at least one hardware form of digital signal processing (DSP), a field programmable gate array (FPGA), and a programmable logic array (PLA). The processor 1301 may alternatively include a main processor and a coprocessor. The main processor is configured to process data in an awake state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display. In some embodiments, the processor 1301 may further include an AI processor. The AI processor is configured to process computing operations related to machine learning.

The memory 1302 may include one or more computer-readable storage media. The computer-readable storage medium may be tangible and non-transitory. The memory 1302 may further include a high-speed random access memory (RAM), and a non-volatile memory such as one or more magnetic disk storage devices and a flash storage device. In some embodiments, the non-transitory computer-readable storage medium in the memory 1302 is configured to store at least one instruction. The at least one instruction is executed by the processor 1301 to perform the method for using a virtual item provided in this disclosure.

In some embodiments, the electronic device 1300 may include: a peripheral interface 1303 and at least one peripheral. Specifically, the peripheral device includes: at least one of a radio frequency (RF) circuit 1304, a touch display screen 1305, a camera component 1306, an audio circuit 1307, a positioning component 1308, or a power supply 1309.

The peripheral interface 1303 may be configured to connect the at least one peripheral related to Input/Output (I/O) to the processor 1301 and the memory 1302. In some embodiments, the processor 1301, the memory 1302, and the peripheral interface 1303 are integrated on the same chip or the same circuit board. In some other embodiments, any one or two of the processor 1301, the memory 1302, and the peripheral interface 1303 may be implemented on an independent chip or circuit board. This is not limited in this embodiment.

The RF circuit 1304 is configured to receive and transmit an RF signal, which is also referred to as an electromagnetic signal. The RF circuit 1304 communicates with a communication network and another communication device by using the electromagnetic signal. The RF circuit 1304 converts an electrical signal into an electromagnetic signal for transmission, or converts a received electromagnetic signal into an electrical signal. In some examples, the RF circuit 1304 includes: an antenna system, an RF transceiver, one or more amplifiers, a tuner, an oscillator, a DSP, a codec chip set, a subscriber identity module card, and the like. The RF circuit 1304 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a WiFi network. In some embodiments, the RF 1304 may further include a circuit related to NFC, which is not limited in this disclosure.

The touch display screen 1305 is configured to display a UI. The UI may include a graph, text, an icon, a video, and any combination thereof. The touch display screen 1305 also has a capability of acquiring a touch signal on or above a surface of the touch display screen 1305. The touch signal may be inputted, as a control signal, to the processor 1301 for processing. The touch display screen 1305 is configured to provide a virtual button and/or a virtual keyboard, which is also referred to as a soft button and/or a soft keyboard. In some embodiments, there may be one touch display screen 1305, disposed on a front panel of the electronic device 1300. In some other embodiments, there are at least two touch display screens 1305, disposed on different surfaces of the electronic device 1300 respectively or in a folded design. In still other embodiments, the touch display screen 1305 may be a flexible display screen, disposed on a curved surface or a folded surface of the electronic device 1300. Even, the touch display screen 1305 may be further set in a non-rectangular irregular pattern, namely, a special-shaped screen. The touch display screen 1305 may be made of a material such as a liquid crystal display (LCD) or an organic light-emitting diode (OLED).

The camera component 1306 is configured to acquire an image or a video. In some examples, the camera component 1306 includes a front-facing camera and a rear-facing camera. Generally, the front-facing camera is configured to implement a video call or self-portrait. The rear-facing camera is configured to capturing a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and VR shooting functions by fusing the main camera and the wide-angle camera. In some embodiments, the camera component 1306 may further include a flash. The flash may be a single color temperature flash or a double color temperature flash. The double color temperature flash refers to a combination of a warm light flash and a cold light flash, and may be used for light compensation under different color temperatures.

The audio circuit 1307 is configured to provide an audio interface between a user and the electronic device 1300. The audio circuit 1307 may include a microphone and a speaker. The microphone is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound collection or noise reduction, there may be a plurality of microphones, respectively disposed at different parts of the electronic device 1300. The microphone may be further an array microphone or an omnidirectional collection microphone. The speaker is configured to convert electric signals from the processor 1301 or the RF circuit 1304 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1307 may further include an earphone jack.

The positioning component 1308 is configured to position a current geographic location of the electronic device 1300, to implement a navigation or a location based service (LBS). The positioning component 1308 may be a positioning component based on the Global Positioning System (GPS) of the United States, the BeiDou system of China, or the GALILEO System of the European Union.

The power supply 1309 is configured to supply power to components in the electronic device 1300. The power supply 1309 may be an alternating current, a direct current, a primary battery, or a rechargeable battery. When the power supply 1309 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the electronic device 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the electronic device 1300. For example, the acceleration sensor 1311 may be configured to detect components of gravity acceleration on the three coordinate axes. The processor 1301 may control, according to a gravity acceleration signal acquired by the acceleration sensor 1311, the touch display screen 1305 to display the UI in a frame view or a portrait view. The acceleration sensor 1311 may be further configured to acquire motion data of a game or a user.

The gyroscope sensor 1312 may detect a body direction and a rotation angle of the electronic device 1300. The gyroscope sensor 1312 may cooperate with the acceleration sensor 1311 to acquire a 3D action by the user on the electronic device 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed on a side frame of the electronic device 1300 and/or a lower layer of the touch display screen 1305. When the pressure sensor 1313 is disposed at the side frame of the electronic device 1300, a holding signal of the user on the electronic device 1300 may be detected, and left/right hand identification and a quick action may be performed according to the holding signal. When the pressure sensor 1313 is disposed at the lower layer of the touch display screen 1305, an operable control on the UI interface can be controlled according to a pressure operation of the user on the touch display screen 1305. The operable control includes at least one of a button control, a scroll-bar control, an icon control, or a menu control.

The fingerprint sensor 1314 is configured to acquire a user's fingerprint to identify a user's identity according to the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front face, a rear face, or a side face of the electronic device 1300. In a case that a physical button or a vendor logo is disposed on the electronic device 1300, the fingerprint sensor 1314 may be integrated together with the physical button or the vendor logo.

The optical sensor 1315 is configured to acquire ambient light intensity. In an embodiment, the processor 1301 may control display brightness of the touch display screen 1305 according to the ambient light intensity acquired by the optical sensor 1315. Specifically, in a case that the ambient light intensity is relatively high, the display brightness of the touch display screen 1305 is increased. In a case that the ambient light intensity is relatively low, the display brightness of the touch display screen 1305 is reduced. In another embodiment, the processor 1301 may further dynamically adjust a camera parameter of the camera component 1306 according to the ambient light intensity acquired by the optical sensor 1315.

The proximity sensor 1316, also referred to as a distance sensor, is generally disposed on the front surface of the electronic device 1300. The proximity sensor 1316 is configured to acquire a distance between a front face of the user and the front face of the electronic device 1300. In an embodiment, in a case that the proximity sensor 1316 detects that the distance between the user and the front of the electronic device 1300 is gradually smaller, the processor 1301 controls the touch display screen 1305 to be switched from a screen-on state to a screen-off state. In a case that the proximity sensor 1316 detects that the distance between the user and the front of the electronic device 1300 is gradually larger, the processor 1301 controls the touch display screen 1305 to be switched from the screen-off state to the screen-on state.

A person skilled in the art may understand that the structure shown in FIG. 23 does not constitute a limitation to the electronic device 1300, and the electronic device may include more components or fewer components than those shown in the figure, or some components may be combined, or a different component deployment may be used.

Figure 24:
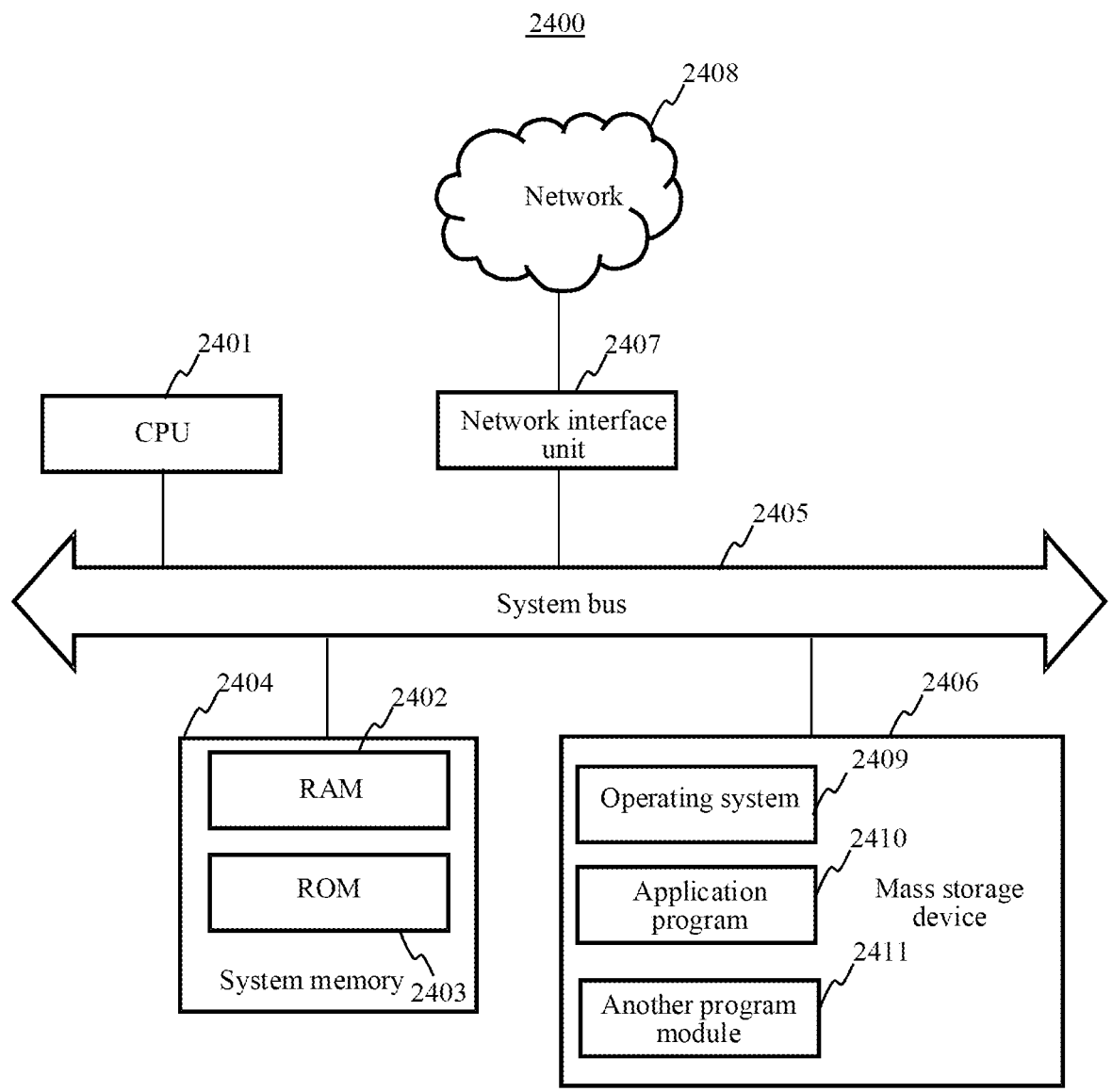
FIG. 24 is a structural block diagram of a computer device according to an exemplary embodiment.

FIG. 24 is a structural block diagram of a computer device 2400 according to an exemplary embodiment. The computer device may be implemented as the server in the foregoing solution of this disclosure. The computer device 2400 includes a CPU 2401, a system memory 2404 including a RAM 2402 and a read-only memory (ROM) 2403, and a system bus 2405 connecting the system memory 2404 to the CPU 2401. The computer device 2400 further includes a mass storage device 2406 configured to store an operating system 2409, an application program 2410, and another program module 2411.

The mass storage device 2406 is connected to the CPU 2401 by using a mass storage controller (not shown) connected to the system bus 2405. The mass storage device 2406 and a computer-readable medium associated with the mass storage device provide non-volatile storage to the computer device 2400. That is, the mass storage device 2406 may include a computer-readable medium (not shown) such as a hard disk or a compact disc ROM (CD-ROM) drive.

Without loss of generality, the computer readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may learn that the computer storage medium is not limited to the foregoing types. The system memory 2404 and the large-capacity storage device 2406 may be collectively referred to as a memory.

According to the embodiments of the present disclosure, the computer device 2400 may further be connected, through a network such as the Internet, to a remote computer on the network. That is, the computer device 2400 may be connected to a network 2408 by using a network interface unit 2407 connected to the system bus 2405, or may be connected to another type of network or a remote computer system (not shown) by using a network interface unit 2407.

The memory further includes at least one instruction, at least one program, a code set, or an instruction set. The at least one instruction, the at least one program, the code set, or the instruction set is stored in the memory. The CPU 2401 executes the at least one instruction, the at least one program, the code set, or the instruction set to implement all or part of the steps in the method for using a virtual item in the foregoing embodiments.

This disclosure further provides a computer device. The computer device includes a processor and a memory. The memory stores at least one instruction, at least one program, a code set, or an instruction set. The at least one instruction, the at least one program, the code set, or the instruction set is loaded and executed by the processor to implement the method for using a virtual item provided in the foregoing method embodiments.

In an exemplary embodiment, this disclosure further provides a computer-readable storage medium, storing at least one computer program, the at least one computer program being loaded and executed by a processor to implement the method for using a virtual item provided in the foregoing method embodiments.

In an exemplary embodiment, a computer program product or a computer program is further provided. The computer program product or the computer program includes computer instructions, and the computer instructions are stored in a computer-readable storage medium. A processor of the computer device reads the computer instructions from the computer-readable storage medium and executes the computer instructions, to cause the computer device to perform the method for using a virtual item provided in the foregoing method embodiments.

A person of ordinary skill in the art may understand that all or some of the steps of the foregoing embodiments may be implemented by using hardware, or may be implemented by a program instructing relevant hardware. The program may be stored in a computer-readable storage medium (e.g., a non-transitory computer-readable storage medium). The storage medium may be a ROM, a magnetic disk, an optical disc, or the like.

The foregoing descriptions are some embodiments of this disclosure, but are not intended to limit this disclosure. Any modification, equivalent replacement, or improvement made within the spirit and principle of this disclosure shall fall within the protection scope of this disclosure.

What is claimed is:

1. A method for virtual environment control, comprising:
   displaying a first user interface (UI) that provides a virtual environment observed from a perspective of a first virtual character that has a first virtual item;
   controlling, by processing circuitry in a terminal device, in response to a firing instruction, the first virtual character to use the first virtual item;
   determining, by the processing circuitry, a category of a subject in an influence range of the first virtual item from a plurality of categories that the first virtual item is capable to influence on, the plurality of categories comprising at least a virtual character category indicating that the subject is a second virtual character and a virtual item category indicating that the subject is a second virtual item; and
   controlling, by the processing circuitry, the first virtual item to produce an effect on the subject based on the determined category, the effect changing an attribute value associated with the determined category of the subject.

2. The method according to claim 1, wherein the controlling the first virtual item to produce the effect on the subject further comprises:
controlling, in response to the subject being the second virtual character in the virtual character category, the first virtual item to produce a first effect on the second virtual character, the first effect affecting a first attribute value of the second virtual character; and
controlling, in response to the subject being the second virtual item in the virtual item category, the first virtual item to produce a second effect on the second virtual item, the second effect changing a second attribute value of the second virtual item.

3. The method according to claim 2, wherein the second effect comprises at least one of destroying the second virtual item, reducing the second attribute value of the second virtual item, or increasing the second attribute value of the second virtual item.

4. The method according to claim 2, wherein
the controlling the first virtual item to produce the second effect on the second virtual item comprises:
obtaining a type of the first virtual item;
determining the second effect corresponding to the type of the first virtual item; and
changing a specified attribute value of the second virtual item based on the second effect corresponding to the type of the first virtual item.

5. The method according to claim 4, further comprising:
superimposing and displaying influence prompt information on the first UI based on the second effect corresponding to a type of the second virtual item, the influence prompt information prompting the second effect.

6. The method according to claim 2, wherein the controlling the first virtual character to use the first virtual item comprises:
controlling the first virtual character to use the first virtual item toward a landing point, the landing point being a specified position in the virtual environment, and
the influence range of the first virtual item defining a space range within which distances of points to the landing point are respectively less than an effective radius.

7. The method according to claim 6, wherein the first virtual item is a throwing item; and
the controlling the first virtual character to use the first virtual item toward the landing point comprises:
determining a throwing path of the first virtual item, an end point of the throwing path being the landing point, the throwing path being calculated according to at least one parameter selected from the perspective of the first virtual character, a position of the first virtual character, a throwing direction by the first virtual character, a throwing starting point, a throwing force, or a throwing speed of the first virtual item;
controlling the first virtual character to throw the first virtual item along the throwing path; and
displaying, a second UI that shows a special effect line and the first virtual item moving along the special effect line, and the special effect line being determined according to at least two points on the throwing path.

8. The method according to claim 6, wherein the first virtual item is a shooting item; and the controlling the first virtual character to use the first virtual item toward the landing point comprises:
determining a ballistic path of the first virtual item, an end point of the ballistic path being the landing point, the ballistic path being calculated according to at least one parameter selected from the perspective of the first virtual character, a position of the first virtual character, a shooting direction, a shooting starting point, a shooting force, or a shooting speed of the first virtual item; and
controlling the first virtual character to shoot the first virtual item along the ballistic path.

9. The method according to claim 6, wherein after the controlling the first virtual character to use the first virtual item toward the landing point, the method further comprises:
transmitting a throwing result of the first virtual item to a server, the throwing result comprising the landing point; and
receiving a use result of the first virtual item from the server, the use result comprising the effect of using the first virtual item, and the effect comprising at least one of the first effect or the second effect.

10. The method according to claim 2, wherein the first effect further comprises an activity limitation of the second virtual character, and the activity limitation of the second virtual character comprises at least one of movement speed reduction, line-of-sight obstruction, slow activity, control manner change, item use limitation, or movement manner limitation of the second virtual character.

11. A non-transitory computer-readable medium storing instructions which when executed by a computer cause the computer to perform the method for virtual environment control according to claim 1.

12. A method for virtual environment control, comprising:
displaying a third user interface (UI) that provides a virtual environment observed from a perspective of a second virtual character, and a user interaction control component;
receiving a use result of a first virtual item by a first virtual character, the use result being received from a server, wherein the use result on a subject in an influence range of the first virtual item is based on a determined category from a plurality of categories that the first virtual item is capable to influence on, the plurality of categories comprising at least a virtual character category indicating that the subject is the second virtual character and a virtual item category indicating that the subject is a second virtual item; and
displaying a fourth UI in response to the subject of the use result being the second virtual character, the fourth UI provides the virtual environment observed from the perspective of the second virtual character, and the user interaction control component that is at least partially occluded.

13. The method according to claim 12, wherein after the displaying the fourth UI, the method further comprises:
controlling, in response to receiving a control instruction based on the user interaction control component that is at least partially occluded, the second virtual character to move in the virtual environment, the control instruction being generated according to a trigger operation received by the user interaction control component that is at least partially occluded.

14. The method according to claim 12, wherein the third UI further comprises a first hit point value of the second virtual character; and the fourth UI further comprises a second hit point value of the second virtual character, the second hit point value being less than the first hit point value, a difference between the first hit point value and the second hit point value being equal to a damage value, and the damage value being equal to 0 or less than a normal attack damage value.

15. The method according to claim 12, wherein the use result comprises a first effect produced by the first virtual item on the second virtual character, the first effect comprises an activity limitation of the second virtual character, and the activity limitation of the second virtual character comprises at least one of a movement speed reduction, a line of sight obstruction, a slow activity, a control manner change, an item use limitation, or a movement manner limitation of the second virtual character.

16. A non-transitory computer-readable medium storing instructions which when executed by a computer cause the computer to perform the method for virtual environment control according to claim 11.

17. An apparatus, comprising processing circuitry configured to:
   display a first user interface (UI) that provides a virtual environment observed from a perspective of a first virtual character that has a first virtual item;
   control, in response to a firing instruction, the first virtual character to use the first virtual item;
   determine a category of a subject in an influence range of the first virtual item from a plurality of categories that the first virtual item is capable to influence on, the plurality of categories comprising at least a virtual character category indicating that the subject is a second virtual character and a virtual item category indicating that the subject is a second virtual item; and
   control the first virtual item to produce an effect on the subject based on the determined category, the effect changing an attribute value associated with the determined category of the subject.

18. The apparatus according to claim 17, wherein the processing circuitry is further configured to:
   control, in response to the subject being the second virtual character in the virtual character category, the first virtual item to produce a first effect on the second virtual character, the first effect affecting a first attribute value of the second virtual character; and
   control, in response to the subject being the second virtual item in the virtual item category, the first virtual item to produce a second effect on the second virtual item, the second effect changing a second attribute value of the second virtual item.

19. The apparatus according to claim 18, wherein the processing circuitry is configured to:
   obtain a type of the first virtual item;
   determine the second effect corresponding to the type of the first virtual item; and
   change a specified attribute value of the second virtual item based on the second effect corresponding to the type of the first virtual item.

20. The apparatus according to claim 18, wherein
   the processing circuitry is configured to control the first virtual character to use the first virtual item toward a landing point, the landing point being a specified position in the virtual environment, and
   the influence range of the first virtual item defines a space range within which distances of points to the landing point are respectively less than an effective radius.

* * * * *